United States Patent
Ando et al.

(10) Patent No.: US 11,858,371 B2
(45) Date of Patent: Jan. 2, 2024

(54) POWER MANAGEMENT APPARATUS AND POWER MANAGEMENT METHOD

(71) Applicant: TOYOTA JIDOSHA KABUSHIKI KAISHA, Toyota (JP)

(72) Inventors: Toru Ando, Obu (JP); Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 17/169,733

(22) Filed: Feb. 8, 2021

(65) Prior Publication Data

US 2021/0284039 A1 Sep. 16, 2021

(30) Foreign Application Priority Data

Mar. 16, 2020 (JP) .................. 2020-045454

(51) Int. Cl.
| | |
|---|---|
| *B60L 53/63* | (2019.01) |
| *B60L 53/68* | (2019.01) |
| *B60L 58/12* | (2019.01) |
| *B60L 58/26* | (2019.01) |
| *H04W 4/44* | (2018.01) |

(52) U.S. Cl.
CPC ............ *B60L 53/63* (2019.02); *B60L 53/68* (2019.02); *B60L 58/12* (2019.02); *B60L 58/26* (2019.02); *H04W 4/44* (2018.02)

(58) Field of Classification Search
CPC ......... B60L 53/60; B60L 53/62; B60L 53/63; B60L 53/64; B60L 53/65; B60L 53/66; B60L 53/665; B60L 53/67; B60L 53/68; B60L 55/00; B60L 58/00; B60L 58/10; B60L 58/12; B60L 58/13; B60L 58/14; B60L 58/15; B60L 58/18; B60L 58/24; B60L 58/26

See application file for complete search history.

(56) References Cited

U.S. PATENT DOCUMENTS

| | | | |
|---|---|---|---|
| 2013/0335032 A1 | 12/2013 | Kuribayashi et al. | |
| 2018/0170207 A1* | 6/2018 | Ko ...................... | H02J 7/00712 |
| 2020/0231056 A1* | 7/2020 | Sadano ................. | H02J 3/322 |
| 2021/0167602 A1 | 6/2021 | Kitaji | |
| 2022/0334190 A1* | 10/2022 | Jobson ................... | B60L 55/00 |

FOREIGN PATENT DOCUMENTS

| | | |
|---|---|---|
| JP | 2013-109859 A | 6/2013 |
| JP | 2016-158309 A | 9/2016 |
| WO | 2012/120976 A1 | 9/2012 |
| WO | 2020/032082 A1 | 2/2020 |

* cited by examiner

Primary Examiner — Russell Frejd
Assistant Examiner — Sara J Lewandroski
(74) Attorney, Agent, or Firm — Sughrue Mion, PLLC

(57) ABSTRACT

A power management apparatus includes a selector that selects a target number of electrically powered vehicles from a vehicle group including a plurality of electrically powered vehicles and a request processor that can issue to each electrically powered vehicle selected by the selector, a request for at least one of charging of a power storage with electric power from a power grid and power feed to the power grid. The selector obtains a temperature and an SOC of the power storage of each electrically powered vehicle included in the vehicle group and makes selection in accordance with a priority predetermined based on the temperature of the power storage and the SOC of the power storage.

9 Claims, 15 Drawing Sheets

| PRIORITY | 1 | 2 | 3 | 4 |
|---|---|---|---|---|
| CHARGING | A | B | C | D |
| POWER FEED | D | C | B | A |

FIG.18

| PRIORITY | 1 | 2 | 3 | 4 |
|---|---|---|---|---|
| CHARGING | A | B | D | C |
| POWER FEED | D | C | B | A |

FIG.19

| PRIORITY | 1 | 2 | 3 | 4 |
|---|---|---|---|---|
| CHARGING | B | A | D | C |
| POWER FEED | D | C | B | A |

| PRIORITY | 1 | 2 | 3 | 4 | 5 | 6 |
|---|---|---|---|---|---|---|
| CHARGING | A | B | C | D | E | F |
| POWER FEED | F | E | D | C | B | A |

POWER MANAGEMENT APPARATUS AND POWER MANAGEMENT METHOD

This nonprovisional application is based on Japanese Patent Application No. 2020-045454 filed with the Japan Patent Office on Mar. 16, 2020, the entire contents of which are hereby incorporated by reference.

BACKGROUND

Field

The present disclosure relates to a power management apparatus and a power management method, and more specifically to a technique for regulation of supply and demand of electric power by using an electrically powered vehicle.

Description of the Background Art

Japanese Patent Laying-Open No. 2016-158309 discloses a charging and discharging controller that suppresses loss of life of a battery mounted on a vehicle. The charging and discharging controller is mounted on a charging and discharging facility outside the vehicle, and when an ambient temperature is equal to or higher than a prescribed threshold value while the vehicle is connected to the charging and discharging facility, the charging and discharging controller carries out discharging control to provide electric power of the battery to the outside of the vehicle. Under such discharging control, a time period during which the battery is exposed to a high temperature with a state of charge (SOC) thereof being high is reduced and loss of life of the battery is suppressed.

SUMMARY

A power management system that regulates supply and demand of a power grid by using a plurality of electrically powered vehicles has recently been proposed. The electrically powered vehicle refers to a vehicle that travels with electric power stored in a power storage mounted on the vehicle.

The technique described in Japanese Patent Laying-Open No. 2016-158309 is premised on control for each vehicle and does not pay attention to balance between supply and demand of the power grid. In an example where a large number of vehicles adopt the technique above, many vehicles may simultaneously feed power to the power grid on a warm day, which may lead to excessive supply to the power grid.

The present disclosure was made to solve the problem above, and an object thereof is to provide a power management apparatus and a power management method that can generally suppress loss of life of a power storage included in each of a plurality of electrically powered vehicles while supply and demand of a power grid is regulated.

A power management apparatus according to the present disclosure regulates supply and demand of a power grid by issuing to an electrically powered vehicle including a power storage, a request for charging of the power storage with electric power of the power grid or power feed to the power grid. The power management apparatus includes a selector that selects a target number of electrically powered vehicles from a vehicle group including a plurality of electrically powered vehicles and a request processor that issues the request to each electrically powered vehicle selected by the selector. The selector obtains a temperature and a state of charge (SOC) of the power storage of each electrically powered vehicle included in the vehicle group and makes selection in accordance with a priority predetermined based on the temperature of the power storage and the SOC of the power storage.

When a power storage is in a high-SOC and high-temperature state, deterioration of the power storage tends to be accelerated. When the power storage is charged and the SOC thereof becomes high, the power storage tends to deteriorate. When the power storage discharges and the SOC becomes lower, the power storage is less likely to deteriorate.

The power management apparatus regulates supply and demand of the power grid by issuing a request for charging or discharging (power feed to the power grid) of the power storage to the electrically powered vehicle. The request processor issues the request to the electrically powered vehicle selected by the selector. The selector makes selection in accordance with the priority predetermined based on the temperature of the power storage and the SOC of the power storage. In accordance with such a priority, in selection in issuing the request for charging, an electrically powered vehicle in which accelerated deterioration of the power storage by charging is highly likely can be less likely to be selected based on the temperature and the SOC of the power storage. In addition, in accordance with the priority, in selection in issuing the request for power feed, an electrically powered vehicle in a state (the temperature and the SOC) that the power storage thereof tends to deteriorate can more likely to be selected. As the electrically powered vehicle is selected in accordance with the priority as above, loss of life of the power storage provided in each of the plurality of electrically powered vehicles is generally suppressed. The electrically powered vehicle selected by the selector regulates supply and demand of the power grid. The power management apparatus can thus generally suppress loss of life of the power storage provided in each of the plurality of electrically powered vehicles while it regulates supply and demand of the power grid.

The power management apparatus may be able to issue a request for only one of charging of the power storage and power feed to the power grid. Alternatively, the power management apparatus may be able to issue a request for both of charging of the power storage and power feed to the power grid, and may issue a request for any of charging of the power storage and power feed to the power grid depending on a situation. Relation between tendency of deterioration of the power storage and the temperature and the SOC of the power storage may be confirmed in advance through experiments or simulation. The SOC represents a remaining amount of stored power, and it is expressed, for example, as a ratio of a current amount of stored power to an amount of stored power in a fully charged state that ranges from 0 to 100%.

The "target number" refers to the number of vehicles for achieving regulation of supply and demand of the power grid. The selector may start selection of an electrically powered vehicle after it confirms the target number. The target number may be varied depending on capability and/or a state of the selected electrically powered vehicle. For example, when the selector selects an electrically powered vehicle to which a request for charging is to be issued from the request processor, the selector may obtain a cumulative value of electric power that can be charged into each selected electrically powered vehicle each time it newly selects one electrically powered vehicle, and may determine that the number of selected electrically powered vehicles reaches the target number when the obtained cumulative value of electric power reaches target electric power.

The power management apparatus may further include a first storage that stores first priority information that defines a priority in selecting an electrically powered vehicle to which the request for charging is to be issued from the request processor. The first priority information may define a priority for each of a plurality of categories set based on the temperature of the power storage and the SOC of the power storage such that a category lower in SOC of the power storage is higher in priority and a category lower in temperature of the power storage is higher in priority. In selecting the electrically powered vehicle to which the request for charging is to be issued from the request processor, the selector may select the electrically powered vehicle in a descending order of priority from the vehicle group in accordance with the priority for each category defined in the first priority information.

In the power management apparatus, in selection in issuing the request for charging, an electrically powered vehicle low in SOC of the power storage and an electrically powered vehicle low in temperature of the power storage tend to be selected, and an electrically powered vehicle in which the power storage is in a high-SOC and high-temperature state is less likely to be selected. As selection is thus made, loss of life of the power storage provided in each of the plurality of electrically powered vehicles tends to generally be suppressed. Since the priority is provided for each category in the power management apparatus, processing load can be lower than in a configuration where the priority is provided for each electrically powered vehicle.

In any power management apparatus described above, each of the plurality of electrically powered vehicles included in the vehicle group may include a cooling apparatus that cools the power storage. The request processor may issue to each electrically powered vehicle selected by the selector, a further request to lower the temperature of the power storage to a prescribed temperature or lower with the cooling apparatus. The first priority information may define the priority of a first category, a second category, a third category, and a fourth category in the order of the first category, the second category, the third category, and the fourth category. In the first category, the SOC of the power storage is lower than a first threshold value and the temperature of the power storage is lower than a second threshold value. In the second category, the SOC of the power storage is lower than the first threshold value and the temperature of the power storage is higher than the second threshold value. In the third category, the SOC of the power storage is higher than the first threshold value and the temperature of the power storage is lower than the second threshold value. In the fourth category, the SOC of the power storage is higher than the first threshold value and the temperature of the power storage is higher than the second threshold value.

The power management apparatus can generally suppress loss of life of the power storage provided in each of the plurality of electrically powered vehicles under simple control while it regulates supply and demand of the power grid. The power management apparatus issues a further request for lowering the temperature of the power storage to a prescribed temperature or lower with the cooling apparatus. Therefore, even when a vehicle high in temperature of the power storage (for example, a vehicle belonging to the second category or the fourth category) is selected, the cooling apparatus lowers the temperature of the power storage to the prescribed temperature or lower. Deterioration of the power storage by charging is thus suppressed.

Each of the first threshold value and the second threshold value can be set to any value. For example, the first threshold value may be not lower than 30% and not higher than 70% and the second threshold value may be not lower than 30° C. and not higher than 50° C.

Any power management apparatus described above may further include a second storage that stores second priority information that defines a priority in selecting an electrically powered vehicle to which the request for power feed is to be issued from the request processor. The second priority information may define a priority for each of a plurality of categories set based on the temperature of the power storage and the SOC of the power storage such that a category higher in SOC of the power storage is higher in priority and a category higher in temperature of the power storage is higher in priority. In selecting the electrically powered vehicle to which the request for power feed is to be issued from the request processor, the selector may select the electrically powered vehicle in a descending order of priority from the vehicle group in accordance with the priority for each category defined in the second priority information.

In the power management apparatus, in selection in issuing the request for power feed, an electrically powered vehicle in which the power storage is in the high-SOC and high-temperature state tends to be selected and an electrically powered vehicle low in SOC of the power storage and an electrically powered vehicle low in temperature of the power storage are less likely to be selected. As selection is thus made, loss of life of the power storage provided in each of the plurality of electrically powered vehicles tends to generally be suppressed. Since the priority is provided for each category in the power management apparatus, processing load can be lower than in a configuration in which the priority is provided for each electrically powered vehicle.

Any power management apparatus described above may further include an exclusion processor that excludes an electrically powered vehicle that satisfies a prescribed exclusion requirement from the vehicle group. According to such a configuration, an electrically powered vehicle not suitable for the request can be excluded from the vehicle group depending on a situation.

When the request processor issues a request for immediate execution of charging of the power storage or power feed to the power grid, the exclusion processor may exclude an electrically powered vehicle not connected to the power grid from the vehicle group, prior to selection by the selector.

An electrically powered vehicle not connected to the power grid is highly likely to be unable to meet the request for immediate execution of charging or power feed. According to the configuration, an electrically powered vehicle not suitable for the request can be excluded from the vehicle group.

When an outdoor temperature is equal to or higher than a prescribed value, the exclusion processor may exclude an electrically powered vehicle in which the SOC of the power storage is higher than a third threshold value from the vehicle group prior to selection of the electrically powered vehicle to which the request for charging is to be issued from the request processor.

When the power storage high in SOC is charged under a condition of a high outdoor temperature, the temperature of the power storage increases during charging and the power storage is highly likely to be in the high-SOC and high-temperature state. When the power storage at the high SOC and the high temperature is charged, deterioration of the power storage is accelerated. According to the configuration, when the outdoor temperature is equal to or higher than a prescribed value, an electrically powered vehicle in which the SOC of the power storage is higher than the third threshold value is excluded from the vehicle group by the exclusion processor. According to the configuration, an electrically powered vehicle not suitable for the request can be excluded from the vehicle group.

When a period during which charging requested by the request processor is to be carried out includes at least a part of a prescribed time period, the exclusion processor may exclude an electrically powered vehicle in which the SOC of the power storage is higher than a fourth threshold value from the vehicle group prior to selection of the electrically powered vehicle to which the request for charging is to be issued from the request processor.

An environment (for example, an ambient temperature and solar irradiation) around the power storage can be estimated from a time period (time of day). When the power storage is charged while it is located in an environment where the temperature tends to increase and the SOC of the power storage is high, the temperature of the power storage increases during charging and the power storage is highly likely to be in the high-SOC and high-temperature state. According to the configuration, when charging is carried out during the prescribed time period (at prescribed time of day), an electrically powered vehicle in which the SOC of the power storage is higher than the fourth threshold value is excluded from the vehicle group by the exclusion processor. According to the configuration, an electrically powered vehicle not suitable for the request can be excluded from the vehicle group.

In any power management apparatus described above, each of the plurality of electrically powered vehicles included in the vehicle group may include a cooling apparatus that cools the power storage with electric power of the power storage. The request processor may further request each electrically powered vehicle selected by the selector to start, when a temperature of the power storage exceeds a prescribed temperature, cooling of the power storage by the cooling apparatus prior to start of charging in accordance with the request described previously. The exclusion processor may exclude an electrically powered vehicle in which the SOC of the power storage is lower than a fifth threshold value and the temperature of the power storage is higher than the prescribed temperature from the vehicle group.

The power management apparatus includes the request processor that issues, when the temperature of the power storage exceeds the prescribed temperature, a further request for starting cooling of the power storage by the cooling apparatus prior to start of charging in accordance with the request. Therefore, even when a vehicle high in temperature of the power storage is selected, the power storage is cooled by the cooling apparatus prior to start of charging in accordance with the request. Deterioration of the power storage by charging is thus suppressed. When the SOC of the power storage is low and electric power sufficient for driving the cooling apparatus does not remain in the power storage, however, the power storage may overdischarge while the electrically powered vehicle drives the cooling apparatus in accordance with the request and deterioration of the power storage may be accelerated to the contrary. According to the configuration, an electrically powered vehicle in which the SOC of the power storage is lower than the fifth threshold value and the temperature of the power storage is higher than the prescribed temperature is excluded from the vehicle group by the exclusion processor. According to the configuration, an electrically powered vehicle not suitable for the request can be excluded from the vehicle group.

A power management method according to the present disclosure is a power management method of regulating supply and demand of a power grid by issuing to an electrically powered vehicle including a power storage, a request for charging of the power storage with electric power of the power grid or power feed to the power grid, and includes first to third steps which will be described below.

In the first step, a temperature and an SOC of the power storage of each electrically powered vehicle included in a vehicle group are obtained. In the second step, a target number of electrically powered vehicles are selected from the vehicle group in accordance with a priority predetermined based on the temperature of the power storage and the SOC of the power storage. In the third step, the request for charging or power feed is issued to each selected electrically powered vehicle.

According to the power management method as well, similarly to the power management apparatus described previously, loss of life of the power storage provided in each of the plurality of electrically powered vehicles can generally be suppressed while supply and demand of the power grid is regulated.

The electrically powered vehicle includes not only an electric vehicle (EV), a hybrid vehicle (HV), and a plug-in hybrid vehicle (PHV) but also a fuel cell vehicle (FCV) and a range extender EV. The electrically powered vehicle may remotely be controllable or may be able to autonomous driving.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 18 is a diagram showing a first modification of the priority information shown in FIG. 6.

FIG. 19 is a diagram showing a second modification of the priority information shown in FIG. 6.

DESCRIPTION OF THE PREFERRED EMBODIMENTS

Figure 1:
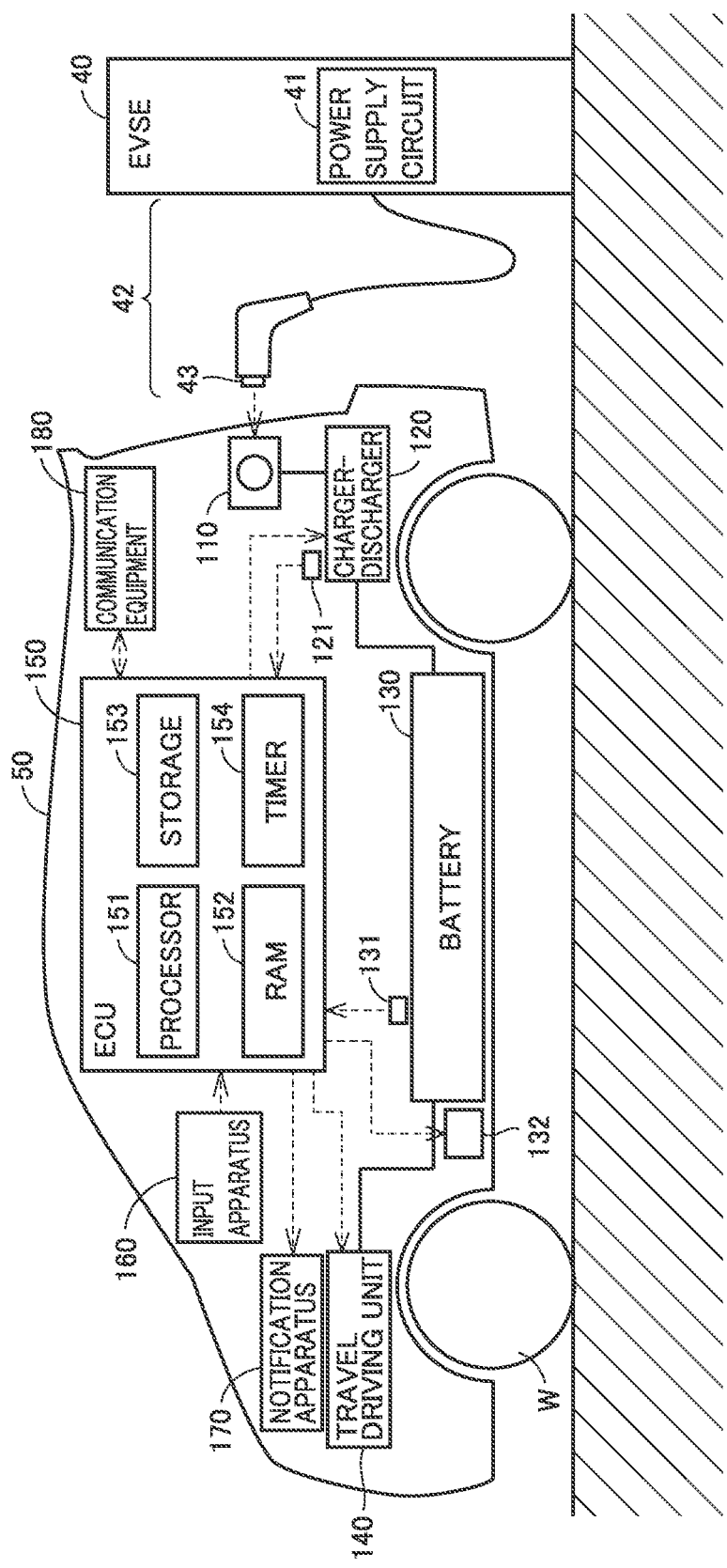
FIG. 1 is a diagram showing a configuration of a vehicle included in a power management system according to an embodiment of the present disclosure.

An embodiment of the present disclosure will be described below in detail with reference to the drawings. The same or corresponding elements in the drawings have the same reference characters allotted and description thereof will not be repeated.

A power management system according to this embodiment includes a plurality of electrically powered vehicles. The plurality of electrically powered vehicles in the power management system may be different from one another in configuration. In this embodiment, each electrically powered vehicle in the power management system is assumed to be configured as shown in FIG. 1. Each of a plurality of electrically powered vehicles included in the power management system is denoted as a "vehicle 50" below and each of a plurality of pieces of EVSE included in the power management system is denoted as "EVSE 40" below, unless they are described as being distinguished from one another. EVSE means electric vehicle supply equipment.

FIG. 1 is a diagram showing a configuration of vehicle 50 included in the power management system according to this embodiment. Referring to FIG. 1, vehicle 50 includes a battery 130 that stores electric power for traveling. Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of secondary batteries (which are generally referred to as "cells") electrically connected to one another. Instead of the secondary battery, another power storage such as an electric double layer capacitor may be adopted. Vehicle 50 and battery 130 according to this embodiment correspond to an exemplary "electrically powered vehicle" and an exemplary "power storage" according to the present disclosure, respectively.

Vehicle 50 includes an electronic control unit (which is referred to as an "ECU" below) 150. ECU 150 carries out charging control and discharging control of battery 130. ECU 150 controls communication with the outside of vehicle 50. Vehicle 50 may be an electric vehicle (EV) that can travel only with electric power stored in battery 130 or a plug-in hybrid vehicle (PHV) that can travel with both of electric power stored in battery 130 and output from an engine (not shown). Though vehicle 50 is driven by a user in this embodiment, vehicle 50 may be self-driving.

Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. In this embodiment, a current sensor is provided in a current path of battery 130. One voltage sensor and one temperature sensor are provided for each cell. Without being limited as such, one voltage sensor and one temperature sensor may be provided for a plurality of cells or for each battery assembly. Monitoring module 131 may be implemented as a battery management system (BMS) further including a state of charge (SOC) estimation function, a state of health (SOH) estimation function, a cell voltage equalization function, a diagnosis function, and a communication function in addition to the sensor function. ECU 150 can obtain a state (for example, a temperature, a current, a voltage, an SOC, and an internal resistance) of battery 130 based on an output from monitoring module 131.

Vehicle 50 further includes a cooling apparatus 132 that cools battery 130. In this embodiment, a blowing apparatus such as a fan or a blower is adopted as cooling apparatus 132. Without being limited as such, cooling apparatus 132 may cool battery 130 by circulating coolant around battery 130. Cooling may be water cooling or air cooling.

Vehicle 50 includes an inlet 110 and a charger-discharger 120 adapted to a power feed type of EVSE 40. Inlet 110 receives electric power supplied from the outside of vehicle 50. Inlet 110 outputs electric power supplied from charger-discharger 120 to the outside of vehicle 50. Though FIG. 1 shows only inlet 110 and charger-discharger 120, vehicle 50 may include an inlet and a charger-discharger for each power feed type so as to adapt to a plurality of power feed types (for example, an alternating-current (AC) type and a direct-current (DC) type).

EVSE 40 includes a power supply circuit 41. A charging cable 42 is connected to EVSE 40. Charging cable 42 may always be connected to EVSE 40 or may be attachable to and removable from EVSE 40. Charging cable 42 includes a connector 43 at its tip end and contains a power line. Connector 43 of charging cable 42 can be connected to inlet 110. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter can be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state (for example, a voltage, a current, and a temperature) of charger-discharger 120 and outputs a result of detection to ECU 150. In this embodiment, monitoring module 121 detects a voltage and a current input to and output from the power conversion circuit.

As EVSE 40 outside vehicle 50 and inlet 110 are connected to each other through charging cable 42, electric power can be supplied and received between EVSE 40 and vehicle 50. Therefore, external charging by vehicle 50 can be carried out (that is, electric power can be supplied from the outside of vehicle 50 to charge battery 130 of vehicle 50). Electric power for external charging is supplied, for example, from EVSE 40 through charging cable 42 to inlet 110. Charger-discharger 120 converts electric power received at inlet 110 into electric power suitable for charging of battery 130 and outputs resultant electric power to battery 130. As EVSE 40 and inlet 110 are connected to each other through charging cable 42, external power feed by vehicle 50 (that is, power feed from vehicle 50 through charging cable 42 to EVSE 40) can be carried out. Electric power for external power feed is supplied from battery 130 to charger-discharger 120. Charger-discharger 120 converts electric power supplied from battery 130 into electric power suitable for external power feed and outputs resultant electric power to inlet 110. When any of external charging and external power feed is performed, the relay of charger-discharger 120 is closed (connected), and when neither of external charging and external power feed is performed, the relay of charger-discharger 120 is opened (disconnected).

The configuration of charger-discharger 120 is not limited as above and can be modified as appropriate. Charger-discharger 120 may include, for example, at least one of a rectification circuit, a power factor correction (PFC) circuit, an insulating circuit (for example, an insulating transformer), an inverter, and a filter circuit. When vehicle 50 carries out external power feed to AC type EVSE, charger-discharger 120 may subject electric power discharged from battery 130 to DC/AC conversion and resultant AC power may be supplied from vehicle 50 to the EVSE. When vehicle 50 carries out external power feed to DC type EVSE, vehicle 50 may supply DC power to the EVSE and an inverter contained in the EVSE may carry out DC/AC conversion. Standards of the DC type EVSE may be any of CHAdeMO, Combined Charging System (CCS), GB/T, and Tesla.

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 160, a notification apparatus 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a not-shown power control unit (PCU) and a motor generator (MG), and allows vehicle 50 to travel with electric power stored in battery 130. The PCU includes, for example, a controller including a processor, an inverter, a converter, and a relay (none of which is shown). The relay included in the PCU is referred to as a "system main relay (SMR)" below. The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the PCU. The SMR is closed (connected) when vehicle 50 travels.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160. A smart speaker that accepts audio input may be adopted as input apparatus 160.

Notification apparatus 170 performs prescribed processing for giving a notification to a user (for example, a driver and/or a passenger of vehicle 50) when a request is given from ECU 150. Notification apparatus 170 may include at least one of a display apparatus (for example, a touch panel display), a speaker, and a lamp (for example, a malfunction indicator lamp (MIL)). Notification apparatus 170 may be implemented by a meter panel, a head-up display, or a car navigation system.

Communication equipment 180 includes various communication interfaces (I/F). Communication equipment 180 may include a data communication module (DCM). Communication equipment 180 may include a communication I/F adapted to the fifth-generation mobile communications system (5G). ECU 150 wirelessly communicates with a communication apparatus outside vehicle 50 through communication equipment 180.

Figure 2:
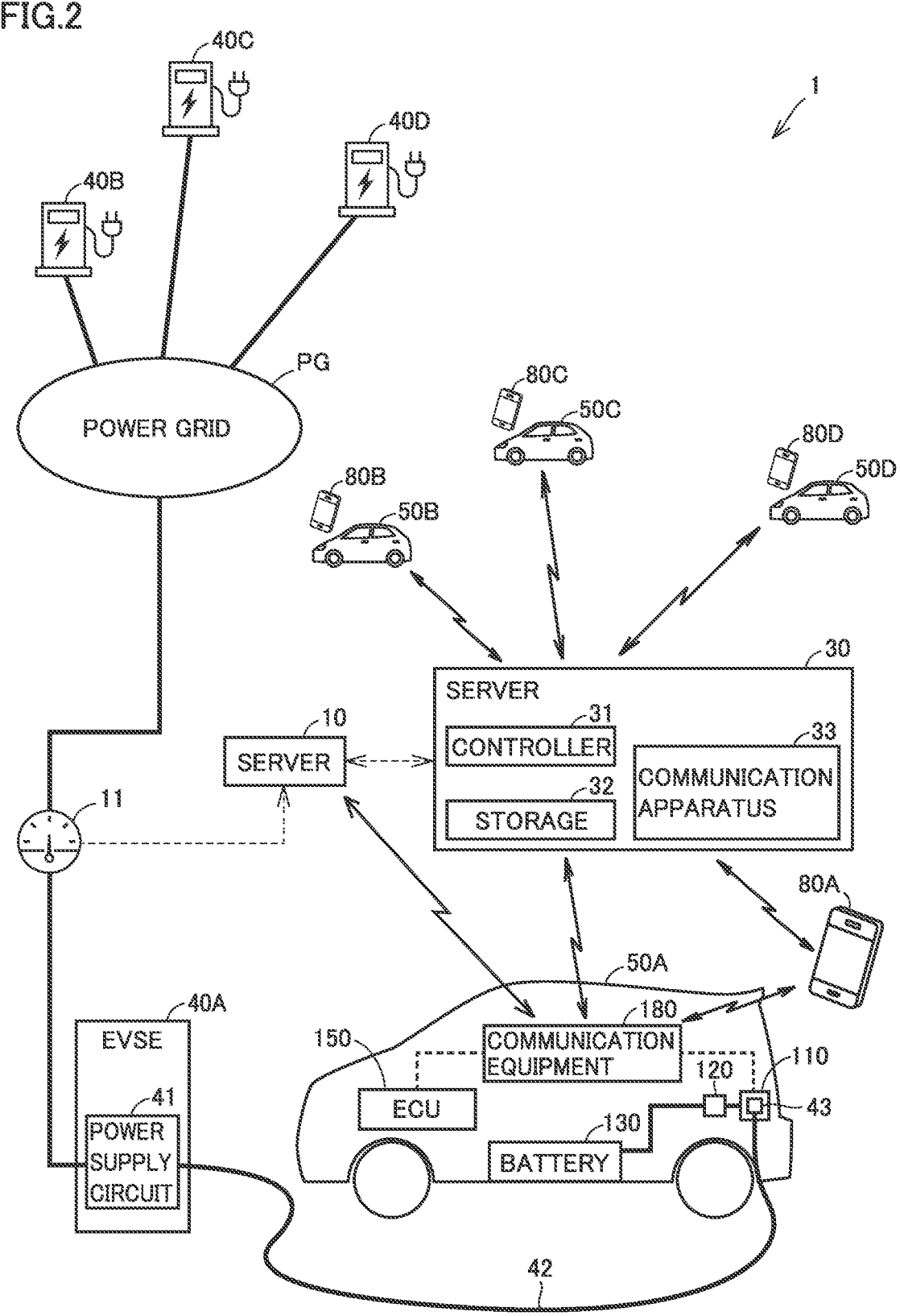
FIG. 2 is a diagram showing a schematic configuration of the power management system according to the embodiment of the present disclosure.

FIG. 2 is a diagram showing a schematic configuration of the power management system according to this embodiment. Referring to FIG. 2, in this embodiment, a vehicle grid integration (VGI) system 1 is constructed by a power grid PG, servers 10 and 30, a smart meter 11, EVSE 40A to 40D, vehicles 50A to 50D, and portable terminals 80A to 80D.

In FIG. 2, portable terminals 80A to 80D correspond to portable terminals carried by users of vehicles 50A to 50D, respectively. Each of portable terminals 80A to 80D is denoted as a "portable terminal 80" below unless they are described as being distinguished from one another. In this embodiment, a smartphone equipped with a touch panel display is adopted as each portable terminal 80. Without being limited thereto, any portable terminal can be adopted as portable terminal 80, and a tablet terminal, a wearable device (for example, a smart watch), or an electronic key can also be adopted.

Though FIG. 2 shows four vehicles, four portable terminals, and four pieces of EVSE, any independent number of vehicles, portable terminals, and pieces of EVSE may be included in VGI system 1, and the number may be set to ten or more or one hundred or more. VGI system 1 may include at least one of a personally owned vehicle (POV) and a MaaS (mobility as a service) vehicle. The MaaS vehicle refers to a vehicle managed by a MaaS entity. VGI system 1 may include at least one of non-public EVSE (for example, home EVSE) that only a specific user can use and public EVSE that an unspecified number of users can use.

Vehicle 50A shown in FIG. 2 is electrically connected to EVSE 40A. In this embodiment, EVSE 40A is an AC charging facility (that is, a common charger) adapted to backfeeding. VGI system 1 may include a charging facility not adapted to backfeeding or may include a DC charging facility (for example, a quick charger). As connector 43 of charging cable 42 connected to EVSE 40A is connected to inlet 110 of vehicle 50A, vehicle 50A and EVSE 40A can communicate with each other and electric power can be supplied and received between EVSE 40A and vehicle 50A. Preparation for external charging and external power feed is thus completed. Communication equipment 180 mounted on vehicle 50A communicates with EVSE 40A through charging cable 42. Communication between EVSE 40A and vehicle 50A may be of any type, and for example, controller area network (CAN) or PLC may be adopted. Standards of communication between EVSE 40A and vehicle 50A may be ISO/IEC15118 or IEC61851.

When a condition for starting external charging is satisfied with preparation for external charging having been completed (for example, a state of vehicle 50A shown in FIG. 2), vehicle 50 starts external charging. In this embodiment, when time to start charging that has been timer-programmed in ECU 150 comes, the condition for starting external charging is satisfied. When charging has not been timer-programmed or participation in DR (details of which will be described later) has not been programmed in ECU 150, connection of connector 43 of charging cable 42 connected to EVSE 40 to inlet 110 of vehicle 50 satisfies the condition for starting immediate charging. Immediate charging refers to external charging started immediately when preparation for external charging in vehicle 50 is completed. When a prescribed operation to start charging by the user onto EVSE 40 or vehicle 50 is performed as well, the condition for starting external charging is satisfied. Any operation to start charging can be set. The operation to start charging may be, for example, an operation to press a prescribed button by the user. During a DR period which will be described later, external charging is carried out under remote control of vehicle 50 by server 30 (see FIGS. 4 and 11).

When a condition for starting external power feed is satisfied with preparation for external power feed having been completed (for example, a state of vehicle 50A shown in FIG. 2), vehicle 50 starts external power feed. For example, when a user performs a prescribed operation to start power feed onto EVSE 40 or vehicle 50, the condition for starting external power feed is satisfied. Any operation to start power feed can be set. The operation to start power feed may be, for example, an operation to press a prescribed button by the user. During a DR period which will be described later, external power feed is carried out under remote control of vehicle 50 by server 30 (see FIGS. 4 and 11).

Power supply circuit 41 included in EVSE 40A is electrically connected to power grid PG with smart meter 11 being interposed. For example, as electric power is supplied from power grid PG through power supply circuit 41 and charging cable 42 to vehicle 50A, battery 130 is externally charged. As vehicle 50A carries out external power feed to EVSE 40A, electric power can be backfed from vehicle 50A through charging cable 42 and power supply circuit 41 to power grid PG. Power supply circuit 41 converts electric power supplied from power grid PG into electric power suitable for external charging and converts electric power supplied from vehicle 50A into electric power suitable for backfeeding.

Smart meter 11 measures an amount of electric power supplied from EVSE 40A to vehicle 50A. Smart meter 11 measures also an amount of electric power backfed from vehicle 50A to EVSE 40A. Smart meter 11 measures an amount of power usage each time a prescribed time period elapses (for example, each time thirty minutes elapse), stores the measured amount of power usage, and transmits the measured amount of power usage to server 10. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30.

Communication equipment 180 mounted on each vehicle 50 included in VGI system 1 wirelessly communicates with server 30, for example, through a mobile communication network (telematics). A signal exchanged between communication equipment 180 and server 30 may be encrypted. In this embodiment, communication equipment 180 mounted on vehicle 50A and portable terminal 80A wirelessly communicate with each other. ECU 150 can control portable terminal 80A through wireless communication to give a notification to a user. Communication equipment 180 and portable terminal 80A may communicate with each other through short-range communication such as Bluetooth® (for example, direct communication in a vehicle or within an area around the vehicle).

Prescribed application software (which is simply referred to as an "application" below) is installed in portable terminal 80. Portable terminal 80 is carried by a user of vehicle 50 and can exchange information with server 30 through the application. A user can operate the application, for example, through a touch panel display (not shown) of portable terminal 80. The touch panel display of portable terminal 80 can give a notification to the user of vehicle 50.

In this embodiment, VGI system 1 functions as a virtual power plant (VPP). The VPP refers to a scheme in which a large number of distributed energy resources (which are also referred to as "DEW" below) are put together according to a sophisticated energy management technology that makes use of the Internet of Things (IoT) and the DER are remotely controlled as being integrated as if the DER functioned as a single power plant. An energy resource possessed by each demand side (which is also referred to as "demand side resources (DSR)" below) represents exemplary DER. In VGI system 1, an electrically powered vehicle including a power storage (that is, vehicle 50 shown in FIG. 1) is adopted as the DSR for realizing the VPP.

In the VPP, an electric utility that puts the DER together to provide an energy management service is referred to as an "aggregator." An electric power utility company, for example, in coordination with an aggregator, can balance between supply and demand of electric power based on demand response (which is also referred to as "DR" below). DR is an approach to balancing between supply and demand of electric power by issuing a prescribed request to each demand side by using a demand response signal (which is also referred to as a "DR signal" below). The DR signal is broadly categorized into two types of a DR signal that requests suppression of power demand or backfeeding (which is also referred to as a "DR suppression signal" below) and a DR signal that requests increase in power demand (which is also referred to as a "DR increase signal" below).

Server 10 belongs to a power transmission and distribution utility. In this embodiment, an electric power utility company serves also as a power generation utility and a power transmission and distribution utility. The electric power utility company constructs a power grid (that is, power grid PG) with a power plant and a power transmission and distribution facility which are not shown, and maintains and manages server 10, smart meter 11, EVSE 40A to 40D, and power grid PG. The electric power utility company can make a profit, for example, by dealing with a demand side (for example, an individual or a company) that uses electric power. In this embodiment, the electric power utility company corresponds to a system operator that operates power grid PG. Power grid PG according to this embodiment corresponds to an exemplary "power grid" according to the present disclosure.

Server 30 can communicate with each of server 10, vehicles 50A to 50D, and portable terminals 80A to 80D. Server 30 belongs to an aggregator. Server 10 and server 30 can communicate with each other, for example, through a virtual private network (VPN). A protocol of communication between server 10 and server 30 may be OpenADR. In this embodiment, a terminal (for example, server 30) of the aggregator can communicate with each of a terminal of an electric power utility company (for example, server 10) and a terminal (for example, communication equipment 180 and portable terminal 80) of a vehicle user. Without being limited as such, VGI system 1 may separately include a server that makes contact with the electric power utility company and a server that makes contact with the vehicle user. These servers may be managed by different electric utilities (for example, upper and lower aggregators).

Server 30 includes a controller 31, a storage 32, and a communication apparatus 33. Controller 31 includes a processor, performs prescribed information processing, and controls communication apparatus 33. Storage 32 can store various types of information. Communication apparatus 33 includes various communication I/Fs. Controller 31 communicates with the outside through communication apparatus 33.

Server 10 levels electric power by using demand response (DR). When server 10 levels electric power, initially, the server transmits a signal (which is also referred to as a "DR participation request" below) requesting participation into DR to each of a plurality of aggregator servers (including server 30). The DR participation request includes a region of interest of DR, a type of DR (for example, DR suppression or DR increase), and a DR period. The DR period refers to information indicating time of start and end of DR. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities of demand sides under the control thereof. The DR capacity refers to a capacity secured by a demand side for DR.

Server 10 determines a DR amount (that is, an amount of power regulation asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each vehicle 50 that can address DR among a plurality of vehicles 50 under the control thereof, generates a DR signal for each vehicle, and transmits the DR signal to each vehicle 50. The DR signal may be a price signal that urges a user of vehicle 50 to regulate supply and demand or a charging command or a power feed command for server 30 to directly control vehicle 50. The price signal may include a type of DR (for example, DR suppression or DR increase), a DR amount for vehicle 50, a DR period, and incentive information. The price signal may be transmitted to portable terminal 80 instead of or in addition to vehicle 50. When vehicle 50 permits remote control (for example, dispatching by server 30), server 30 can directly control vehicle 50 by transmitting a charging command or a power feed command to vehicle 50.

An electric utility can request a user of vehicle 50 to regulate supply and demand of power grid PG by transmitting a DR signal. The DR signal may be transmitted from server 30 to vehicle 50 in response to a DR execution instruction as described above. The DR signal may also be transmitted from server 30 to vehicle 50 based on power market information. ECU 150 receives a DR signal through communication equipment 180 from the outside of the vehicle. The user of vehicle 50 may receive the DR signal through portable terminal 80. When ECU 150 and/or portable terminal 80 receive(s) the DR signal, a user of vehicle 50 can contribute to regulation of supply and demand of power grid PG requested by an electric utility (for example, an electric power utility company or an aggregator) by carrying out external charging or external power feed in accordance with the DR signal by using EVSE 40 and vehicle 50. In this embodiment, when the user of vehicle 50 has contributed to regulation of supply and demand of power grid PG requested by the electric utility, an incentive in accordance with contribution is paid to the user of vehicle 50 by the electric utility based on an agreement between the user of vehicle 50 and the electric utility. The contribution corresponds, for example, to an amount of electric power regulated by external charging or external power feed in accordance with the DR signal. In this embodiment, the contribution is measured by smart meter 11.

An electric utility measures a contribution with any method without being limited to the method of measurement with smart meter 11. The electric utility may find a contribution based on a measurement value from a wattmeter (not shown) contained in EVSE 40. The electric utility may find a contribution based on a measurement value from a sensor mounted on vehicle 50. A portable charging cable may be provided with a metering function and the electric utility may find a contribution based on an amount of electric power measured by the charging cable.

Though server 30 and EVSE 40 do not communicate with each other in this embodiment, server 30 and EVSE 40 may communicate with each other. Server 30 may communicate with vehicle 50 with EVSE 40 being interposed. EVSE 40 may communicate with an EVSE management cloud. A protocol of communication between EVSE 40 and the EVSE management cloud may be open charge point protocol (OCPP).

Figure 3:
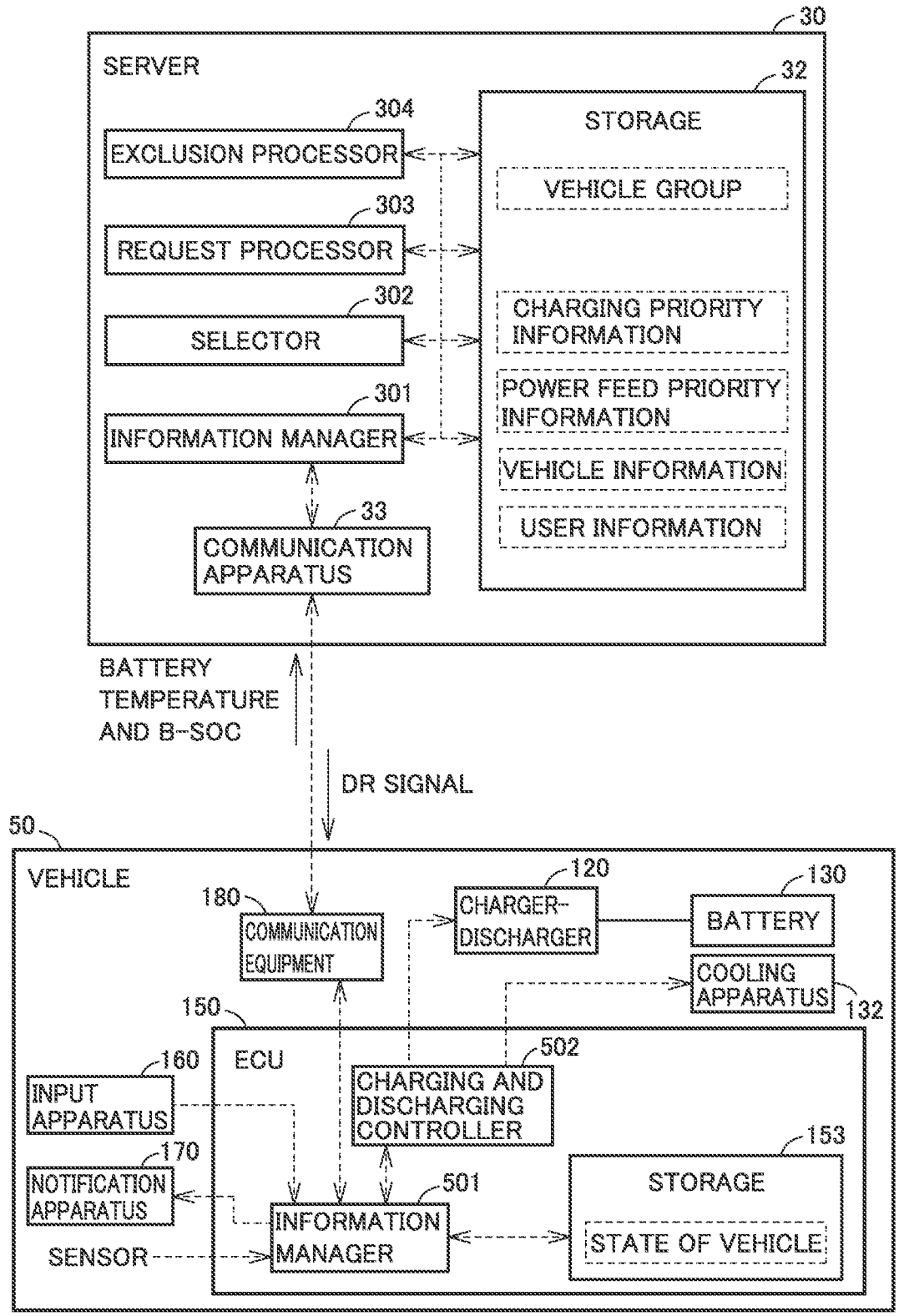
FIG. 3 is a diagram showing a detailed configuration of a vehicle controller and a server included in the power management system according to the embodiment of the present disclosure.

FIG. 3 is a diagram showing a detailed configuration of ECU 150 of vehicle 50 and server 30. With a configuration which will be described below, server 30 according to this embodiment can generally suppress loss of life of battery 130 (power storage) included in each of the plurality of vehicles 50 (electrically powered vehicles) while it regulates supply and demand of power grid PG (power network). Server 30 according to this embodiment corresponds to an exemplary "power management apparatus" according to the present disclosure.

Referring to FIG. 3, ECU 150 includes an information manager 501 and a charging and discharging controller 502. In ECU 150 according to this embodiment, each component above is implemented by processor 151 shown in FIG. 1 and a program (for example, a program stored in storage 153) executed by processor 151. Without being limited as such, each component above may be implemented by dedicated hardware (electronic circuitry).

Information manager 501 obtains a state of vehicle 50 based on outputs from various sensors mounted on vehicle 50 and has storage 153 record the obtained vehicle state. The vehicle state obtained by information manager 501 includes, for example, an outdoor temperature, charging power, fed power, a temperature of battery 130, and an SOC of battery 130. The outdoor temperature is detected by an outdoor temperature sensor (not shown) mounted on vehicle 50. Information manager 501 obtains the temperature of battery 130 based on an output from monitoring module 131. The temperature of battery 130 obtained by information manager 501 and recorded in storage 153 will be referred to as a "battery temperature" below. Monitoring module 131 detects a temperature for each cell included in battery 130 (battery assembly). In this embodiment, an average value of temperatures detected for the cells in battery 130 is adopted as the battery temperature. Without being limited as such, another representative value such as a maximum value or a minimum value may be adopted instead of the average value. Information manager 501 obtains the SOC of battery 130 based on an output from monitoring module 131. The SOC of battery 130 obtained by information manager 501 and recorded in storage 153 is referred to as a "B-SOC" below. Information manager 501 can measure the SOC for each cell included in battery 130 (battery assembly) with a known approach. For example, such an approach as a current integration method or an OCV estimation method can be adopted as the method of measuring the SOC. In this embodiment, the average value of SOCs detected for the cells in battery 130 is adopted as the B-SOC. Without being limited as such, another representative value such as a maximum value or a minimum value may be adopted instead of the average value. The battery temperature and the B-SOC according to this embodiment correspond to an exemplary "temperature of the power storage" and an exemplary "SOC of the power storage" according to the present disclosure, respectively.

Information manager 501 transmits the vehicle state (including the battery temperature and the B-SOC) obtained as above to server 30. When prescribed timing comes (for example, at the time of end of travel of vehicle 50 or connection of the charging connector), information manager 501 transmits data on the vehicle state accumulated in storage 153 to server 30. In this embodiment, server 30 obtains the battery temperature and the B-SOC transmitted at any time from each vehicle 50. This processing corresponds to an exemplary "first step."

Charging and discharging controller 502 carries out charging and discharging control of battery 130 by controlling charger-discharger 120. When the condition for starting external charging described previously is satisfied with preparation for external charging having been completed, charging and discharging controller 502 starts external charging. When the condition for starting external power feed described previously is satisfied with preparation for external power feed having been completed, charging and discharging controller 502 starts external power feed. In this embodiment, charging and discharging controller 502 is remotely controlled by server 30 during the DR period. Though remote control of charging and discharging controller 502 is basically prohibited, remote control of charging and discharging controller 502 is permitted when the user of vehicle 50 approves a request (for example, a charging request or a power feed request which will be described later) from server 30.

In this embodiment, the user can set in charging and discharging controller 502, ON/OFF of cooling in charging and ON/OFF of cooling in power feed through input apparatus 160 or portable terminal 80. ON/OFF setting of each of cooling in charging and cooling in power feed in charging and discharging controller 502 is changed in accordance with a DR setting signal (see S16 in FIG. 4) which will be described later. When the temperature of battery 130 (for example, the average value of the temperatures of the cells) exceeds a prescribed temperature at the time point of start of external charging while cooling in charging has been set to ON, charging and discharging controller 502 activates cooling apparatus 132 to cool battery 130 until the temperature of battery 130 is equal to or lower than the prescribed temperature. While cooling in power feed has been set to ON as well, charging and discharging controller 502 carries out cooling control of battery 130 as in cooling in charging. When the temperature of battery 130 (for example, the average value of the temperatures of the cells) exceeds a prescribed temperature at the time point of start of external power feed, charging and discharging controller 502 activates cooling apparatus 132 to cool battery 130 until the temperature of battery 130 is equal to or lower than the prescribed temperature. When the temperature of battery 130 increases and exceeds the prescribed temperature during charging or power feed, cooling of battery 130 may be resumed. In order to suppress repeated execution and non-execution of cooling (hunting), a temperature threshold value may have a hysteresis. When cooling in charging has been set to OFF in charging and discharging controller 502, cooling is not carried out at the time of start of external charging. When cooling in power feed has been set to OFF in charging and discharging controller 502, cooling is not carried out at the time of start of external power feed.

Server 30 includes an information manager 301, a selector 302, a request processor 303, and an exclusion processor 304. In server 30 according to this embodiment, each component above is implemented by the processor of controller 31 shown in FIG. 2 and a program (a program stored in storage 32) executed by the processor. Without being limited as such, each component above may be implemented by dedicated hardware (electronic circuitry).

Server 30 manages user information (information on each user registered in server 30) and vehicle information (information on each vehicle 50 registered in server 30). A user ID (identification information for identifying a user) is provided for each user and server 30 manages the user information as being distinguished based on the user ID. The user ID also functions as a terminal ID (information for identifying portable terminal 80 carried by the user). The user information includes a communication address of portable terminal 80 carried by the user and a vehicle ID of vehicle 50 belonging to the user. The vehicle ID is identification information for identifying vehicle 50. The vehicle ID is provided for each vehicle 50 and server 30 manages the vehicle information as being distinguished based on the vehicle ID. The vehicle information includes a communication address of communication equipment 180 mounted on vehicle 50 and a vehicle state (including the battery temperature and the B-SOC) received from each vehicle 50. The user information and the vehicle information are stored in storage 32.

The vehicle information further includes a DR period (for example, a charging schedule, a power feed schedule, and a charging suppression schedule requested of vehicle 50 in a DR signal). The charging schedule refers to information indicating a period during which charging is to be carried out (that is, time to start and quit charging). The power feed schedule refers to information indicating a period during which power feed is to be carried out (that is, time to start and quit power feed). The charging suppression schedule refers to information indicating a period during which charging is to be restricted (that is, time to start and quit restriction). Prohibition of charging and restriction of charging power (prohibition of charging with prescribed electric power or higher) represent exemplary charging restriction. When request processor 303 transmits a signal requesting for regulation of supply and demand of power grid PG to the user of vehicle 50 (S13 in FIG. 4 which will be described later) and approval for participation into DR is obtained from the user, information manager 301 updates the DR period linked to that user (more specifically, the vehicle ID of vehicle 50 belonging to the user). Vehicle 50 for which the DR period has been set corresponds to a DR vehicle which will be described later.

The user information may include an acquired incentive amount. The acquired incentive amount refers to a total amount of incentives acquired by the user by participation into DR during a prescribed period.

Selector 302 selects a prescribed target number of vehicles 50 from a vehicle group. The vehicle group is stored in storage 32 and updated any time. The prescribed target number refers to the number of vehicles with which a requested DR amount (that is, an amount of power regulation) can be secured. In this embodiment, vehicle 50 that can participate in DR is selected by selector 302. Vehicle 50 selected by selector 302 is referred to as a "DR vehicle" below. The vehicle group corresponds to candidates for the DR vehicle. In an initial stage, for example, all vehicles 50 within a region of interest of DR are set as belonging to the vehicle group. Each vehicle 50 included in the vehicle group, however, may be excluded from the vehicle group by exclusion processor 304. Exclusion processor 304 excludes vehicle 50 that satisfies a prescribed exclusion requirement from the vehicle group. With exclusion processor 304, vehicle 50 not suitable for a request (for example, vehicle 50 belonging to a user who has rejected the request) can be excluded from the vehicle group.

Request processor 303 can request each DR vehicle selected by selector 302 to carry out charging of battery 130 with electric power from power grid PG, to carry out power feed to power grid PG with electric power from battery 130, and to restrict charging described previously. The request for carrying out charging issued from request processor 303 will simply be referred to as a "charging request" below. The request for carrying out power feed issued from request processor 303 will simply be referred to as a "power feed request." The request for restricting charging issued from request processor 303 will simply be referred to as a "charging restriction request."

Request processor 303 regulates supply and demand of power grid PG by issuing the charging request, the power feed request, or the charging restriction request. In this embodiment, the charging request and the power feed request will mainly be described. Request processor 303 should only be able to issue a request for carrying out any of charging and power feed, and it is not essential for request processor 303 to be able to issue a request for restriction of charging.

Storage 32 further stores charging priority information and power feed priority information. The charging priority information refers to information that defines a priority in selection of vehicle 50 in response to the charging request. When selector 302 selects vehicle 50 in response to the charging request, it selects a target number of vehicles 50 in accordance with the priority indicated in the charging priority information. The power feed priority information refers to information that defines a priority in selection of vehicle 50 in response to the power feed request. When selector 302 selects vehicle 50 in response to the power feed request, it selects a target number of vehicles 50 in accordance with the priority indicated in the power feed priority information. Details of each of the charging priority information and the power feed priority information will be described later (see FIGS. 5 and 6). The charging priority information and the power feed priority information according to this embodiment correspond to exemplary "first priority information" and exemplary "second priority information" according to the present disclosure, respectively. Storage 32 according to this embodiment corresponds to an exemplary "first storage" and an exemplary "second storage" according to the present disclosure.

Figure 4:
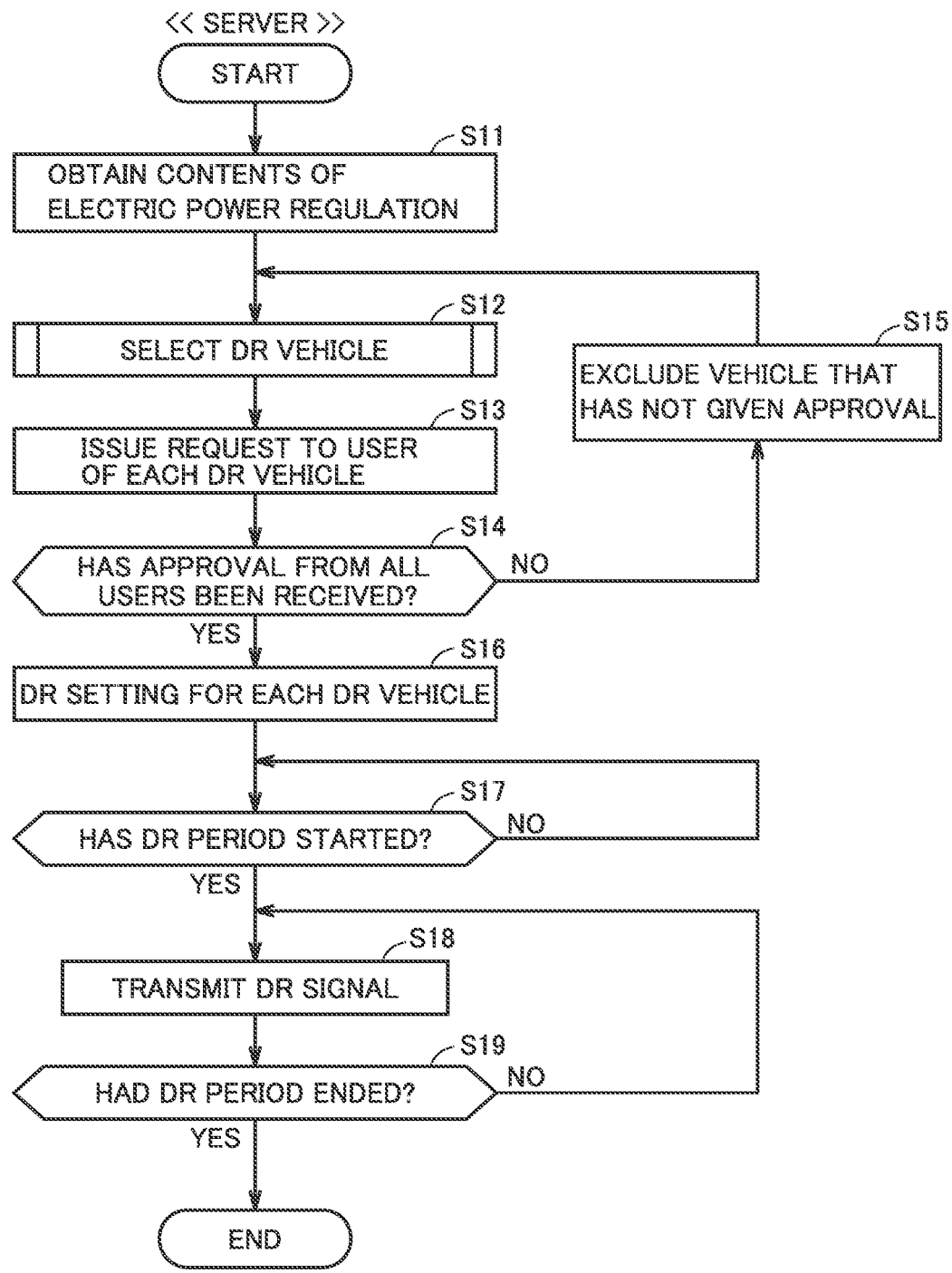
FIG. 4 is a flowchart showing a power management method according to the embodiment of the present disclosure.

FIG. 4 is a flowchart showing processing performed at the time when server 30 issues the charging request or the power feed request. Processing shown in this flowchart is started when an aggregator is requested to regulate supply and demand of power grid PG by an electric power utility company or a power market. The processing shown in FIG. 4 is started, for example, in response to reception by server 30 of a DR execution instruction described previously from server 10. Without being limited as such, the processing shown in FIG. 4 may be started in response to an instruction from the aggregator through a prescribed input apparatus (not shown) to server 30 to perform processing (for example, selection of the DR vehicle and transmission of the DR signal) involved with DR.

Referring to FIG. 4 together with FIGS. 1 to 3, in a step (which is simply denoted as "S" below) 11, selector 302 obtains contents of power regulation (for example, contents of a DR execution instruction). The contents of power regulation include a type of DR (for example, the charging request or the power feed request), an amount of power regulation, a region of interest of DR, and a DR period.

In S12, selector 302 selects a DR vehicle for meeting the charging request or the power feed request from the vehicle group (candidates for the DR vehicle). S12 according to this embodiment corresponds to an exemplary "second step." In the initial stage (that is, at the time of start of a series of processing shown in FIG. 4), the vehicle group includes all vehicles 50 within the region of interest of DR. Vehicle 50 that satisfies a prescribed exclusion requirement, however, may be excluded from the vehicle group (see, for example, S15 which will be described later). When the amount of power regulation requested by the electric power utility company or the power market is not satisfied in spite of selection of all vehicles 50 included in the vehicle group, server 30 gives a notification to that effect and aborts the processing. Processing described below is performed on the premise that the vehicle group can satisfy the amount of power regulation requested by the electric power utility company or the power market.

When the type of DR is the charging request, in S12, selector 302 selects a DR vehicle (which is also referred to as a "DR increase vehicle" below) for meeting the charging request. When the type of DR is the power feed request, in S12, selector 302 selects a DR vehicle (which is also referred to as a "DR suppression vehicle" below) for meeting the power feed request. In this embodiment, in selecting the DR increase vehicle, selector 302 makes selection with reference to the charging priority information, and in selecting the DR suppression vehicle, selector 302 makes selection with reference to the power feed priority information. The charging priority information and the power feed priority information according to this embodiment will be described below with reference to FIGS. 5 and 6. The charging priority information and the power feed priority information include categorization information shown in FIG. 5 and priority information shown in FIG. 6.

Figures 5, 6:
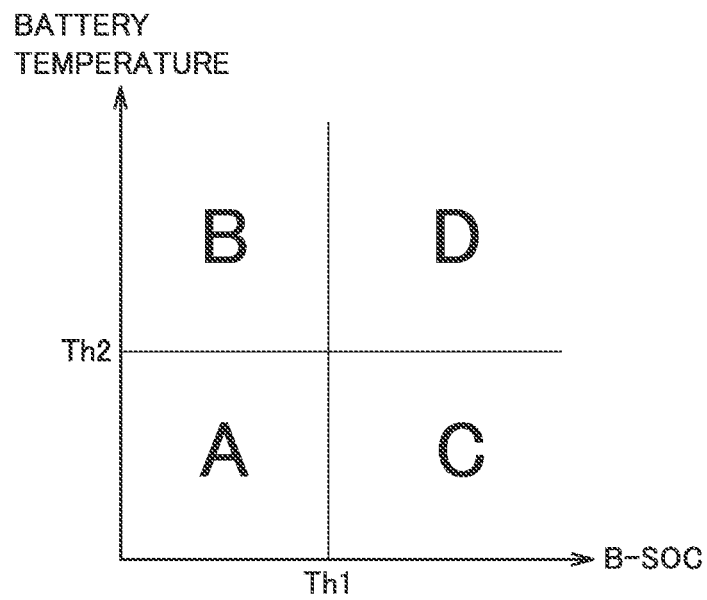
FIG. 5 is a diagram showing exemplary categorization information for classifying each vehicle included in a vehicle group.
FIG. 6 is a diagram showing exemplary priority information included in charging priority information and power feed priority information.

FIG. 5 is a diagram showing exemplary categorization information for classifying each vehicle 50 included in the vehicle group. Referring to FIG. 5, the categorization information defines a plurality of categories (for example, categories A to D) based on the battery temperature and the B-SOC. Category A refers to a category where the B-SOC is lower than a prescribed threshold value Th1 and the battery temperature is lower than a prescribed threshold value Th2. Category B refers to a category where the B-SOC is lower than threshold value Th1 and the battery temperature is equal to or higher than threshold value Th2. Category C refers to a category where the B-SOC is equal to or higher than threshold value Th1 and the battery temperature is lower than threshold value Th2. Category D refers to a category where the B-SOC is equal to or higher than threshold value Th1 and the battery temperature is equal to or higher than threshold value Th2. Each of threshold values Th1 and Th2 can be set to any value. In this embodiment, threshold value Th1 is set to 50% and threshold value Th2 is set to 40° C. Category A, category B, category C, and category D according to this embodiment correspond to an exemplary "first category," an exemplary "second category," an exemplary "third category," and an exemplary "fourth category" according to the present disclosure, respectively. Threshold value Th1 and threshold value Th2 according to this embodiment correspond to an exemplary "first threshold value" and an exemplary "second threshold value" according to the present disclosure, respectively.

Selector 302 obtains the battery temperature and the B-SOC of each vehicle 50 included in the vehicle group with reference to the vehicle information stored in storage 32. Selector 302 then classifies vehicles 50 included in the vehicle group into categories (any of categories A to D) in accordance with the battery temperature and the B-SOC with reference to the categorization information.

FIG. 6 is a diagram showing exemplary priority information included in the charging priority information and the power feed priority information. Referring to FIG. 6, priority information in the charging priority information defines the priority in the order of category A, category B, category C, and category D. Specifically, in the charging priority information, the priority of categories A to D is defined in the descending order from the first place to the fourth place. The charging priority information thus defines the priority for each of categories A to D such that the category lower in B-SOC (categories A and B) is higher in priority and the category lower in battery temperature (categories A and C) is higher in priority. The priority information in the power feed priority information defines the priority in the order of category D, category C, category B, and category A. Specifically, in the power feed priority information, the priority of categories A to D is defined in the ascending order from the fourth place to the first place. The power feed priority information thus defines the priority for each of categories A to D such that the category higher in B-SOC (categories C and D) is higher in priority and the category higher in battery temperature (categories B and D) is higher in priority.

Though the charging priority information and the power feed priority information use common categorization information in this embodiment, categorization information included in the charging priority information and categorization information included in the power feed priority information may be different from each other. For example, the category information included in the charging priority information and the categorization information included in the power feed priority information may be different from each other in boundary value (for example, threshold values Th1 and Th2) between the categories.

Figure 7:
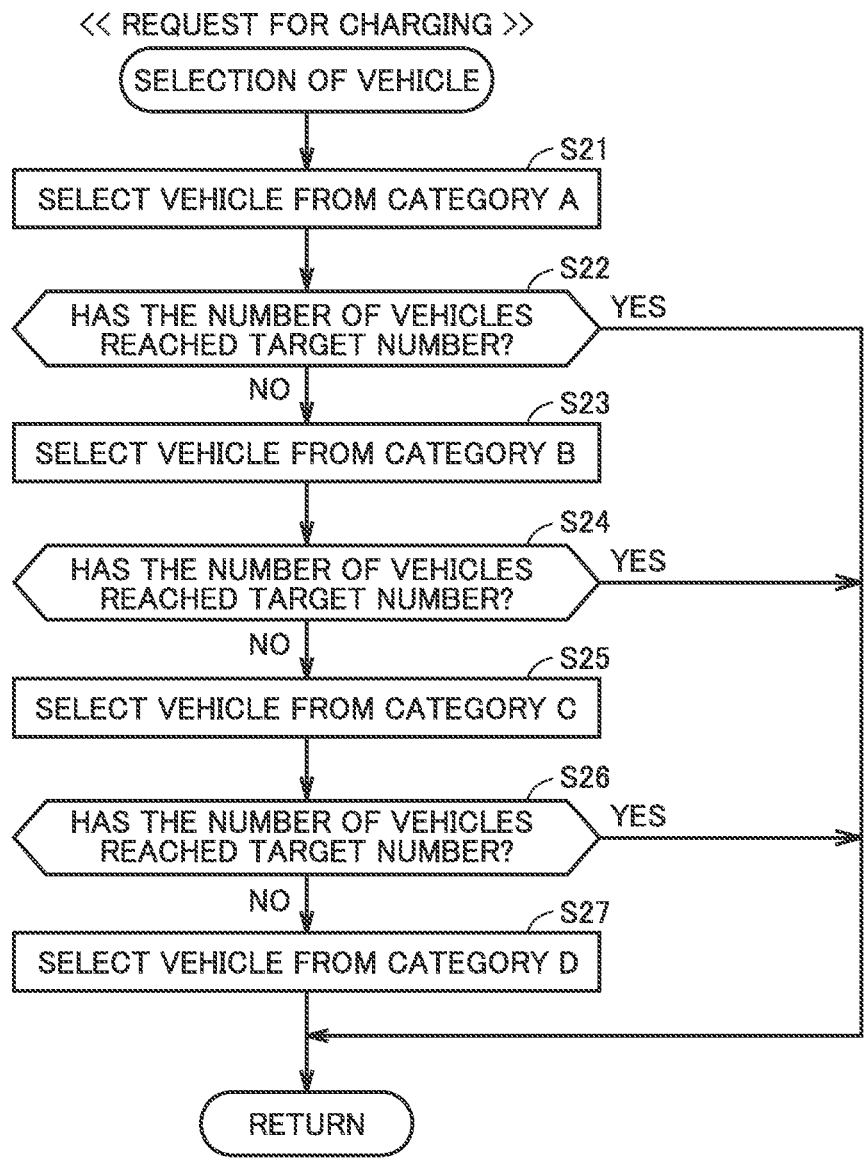
FIG. 7 is a flowchart showing details of processing performed at the time when a power management apparatus according to the embodiment of the present disclosure selects a DR increase vehicle.

In selecting a DR increase vehicle, selector 302 selects an electrically powered vehicle (vehicle 50) from the vehicle group in the order of higher priority, in accordance with the priority for each category defined in the categorization information (see FIG. 5) in the charging priority information. FIG. 7 is a flowchart showing details of processing performed in S12 in FIG. 4 by server 30 in selecting a DR increase vehicle.

Referring to FIG. 7 together with FIGS. 1 to 6, in S21, selector 302 selects a DR increase vehicle from among vehicles 50 belonging to category A (see FIGS. 5 and 6) highest in priority in the vehicle group. Thereafter, in S22, selector 302 determines whether or not the number of the DR increase vehicles has reached the target number by selection only from category A. Each vehicle 50 belonging to category A in the vehicle group is also referred to as a "candidate A" below.

When the number of vehicles as candidates A is equal to or larger than the target number, in S21, selector 302 selects the target number of DR increase vehicles from among candidates A. For example, selector 302 randomly selects the DR increase vehicle one by one from among candidates A, and when the number of DR increase vehicles has reached the target number, it quits selection. Each time selector 302 selects a new DR increase vehicle, selector 302 obtains a cumulative value of electric power that can be charged into each DR increase vehicle, and when the obtained cumulative value of electric power has reached target electric power (the amount of power regulation), selector 302 may determine that the number of DR increase vehicles has reached the target number. When the target number of DR increase vehicles are selected in processing in S21 (YES in S22), the process returns to a main routine (FIG. 4) and the process proceeds to S13 in FIG. 4.

When the number of DR increase vehicles has not reached the target number by selection only from category A (NO in S22), all of candidates A are selected in S21 and the process proceeds to S23. In S23, selector 302 selects the DR increase vehicle from among vehicles 50 belonging to category B (see FIGS. 5 and 6) second highest in priority in the vehicle group. Thereafter, in S24, selector 302 determines whether or not the number of DR increase vehicles has reached the target number by selection from categories A and B. Each vehicle 50 belonging to category B in the vehicle group is also referred to as a "candidate B" below.

When the total number of vehicles as candidates A and B is equal to or larger than the target number, in S23, selector 302 selects the DR increase vehicle from among candidates B until the number of DR increase vehicles reaches the target number. For example, selector 302 randomly selects the DR increase vehicle one by one from among candidates B. The DR increase vehicle (candidate B) selected in S23 is added to the DR increase vehicles (all of candidates A) selected in S21. When the total number of DR increase vehicles has reached the target number, selector 302 quits selection. When the target number of DR increase vehicles are selected in processing in S21 and S23 (YES in S24), the process returns to the main routine (FIG. 4) and the process proceeds to S13 in FIG. 4.

When the number of DR increase vehicles has not reached the target number by selection from categories A and B (NO in S24), all of candidates A and B are selected in S21 and S23 and the process proceeds to S25. In S25, selector 302 selects the DR increase vehicle from among vehicles 50 belonging to category C (see FIGS. 5 and 6) third highest in priority in the vehicle group. Thereafter, in S26, selector 302 determines whether or not the number of DR increase vehicles has reached the target number by selection from categories A, B, and C. Each vehicle 50 belonging to category C in the vehicle group is also referred to as a "candidate C" below.

When the total number of vehicles as candidates A, B, and C is equal to or larger than the target number, in S25, selector 302 selects the DR increase vehicle from among candidates C until the number of DR increase vehicles reaches the target number. For example, selector 302 randomly selects the DR increase vehicle one by one from among candidates C. The DR increase vehicle (candidate C) selected in S25 is added to the DR increase vehicles (all of candidates A and B) selected in S21 and S23. When the total number of DR increase vehicles has reached the target number, selector 302 quits selection. When the target number of DR increase vehicles are selected in processing in S21, S23, and S25 (YES in S26), the process returns to the main routine (FIG. 4) and the process proceeds to S13 in FIG. 4.

When the number of DR increase vehicles has not reached the target number by selection from categories A, B, and C (NO in S26), all of candidates A, B, and C are selected in S21, S23, and S25 and the process proceeds to S27. In S27, selector 302 selects a remaining DR increase vehicle from among vehicles 50 belonging to category D (see FIGS. 5 and 6) lowest in priority in the vehicle group. Each vehicle 50 belonging to category D in the vehicle group is also referred to as a "candidate D" below.

In S27, the DR increase vehicle corresponding to lack with respect to the target number is selected from among candidates D. For example, selector 302 randomly selects the DR increase vehicle one by one from among candidates D. The DR increase vehicle (candidate D) selected in S27 is added to the DR increase vehicles (all of candidates A, B, and C) selected in S21, S23, and S25. When the total number of DR increase vehicles has reached the target number, selector 302 quits selection. Thereafter, the process returns to the main routine (FIG. 4) and the process proceeds to S13 in FIG. 4.

In the processing shown in FIG. 7, in each of categories A to D, the DR increase vehicle is randomly selected. Without being limited as such, a further priority may be set in each category. For example, in each category, vehicle 50 lower in B-SOC may sequentially be selected. Alternatively, a priority may be set as shown in FIG. 8.

Figure 8:
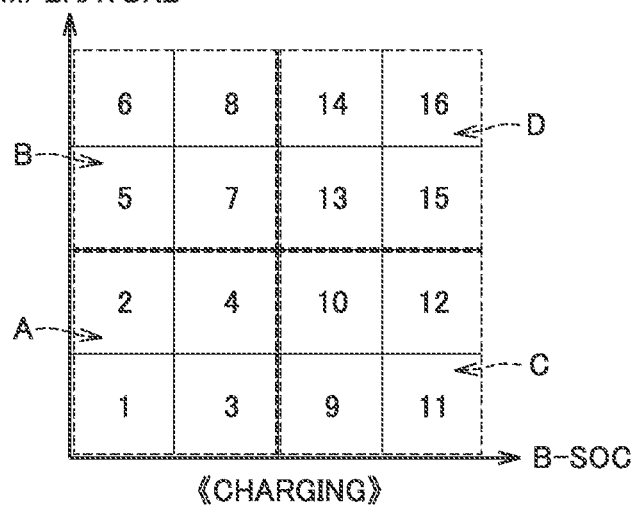
FIG. 8 is a diagram showing a modification of the charging priority information shown in FIGS. 5 and 6.

FIG. 8 is a diagram showing a modification of the charging priority information shown in FIGS. 5 and 6. A figure in FIG. 8 represents a priority in each region. In the example shown in FIG. 8, each of categories A to D is further divided into four regions and a priority is set for each region. In other words, the priority is set for each category resulting from division into sixteen based on the battery temperature and the B-SOC. In the example shown in FIG. 8, the priority for each region is defined such that a region lower in B-SOC is higher in priority and a region lower in battery temperature is higher in priority in each of categories A to D.

Figure 9:
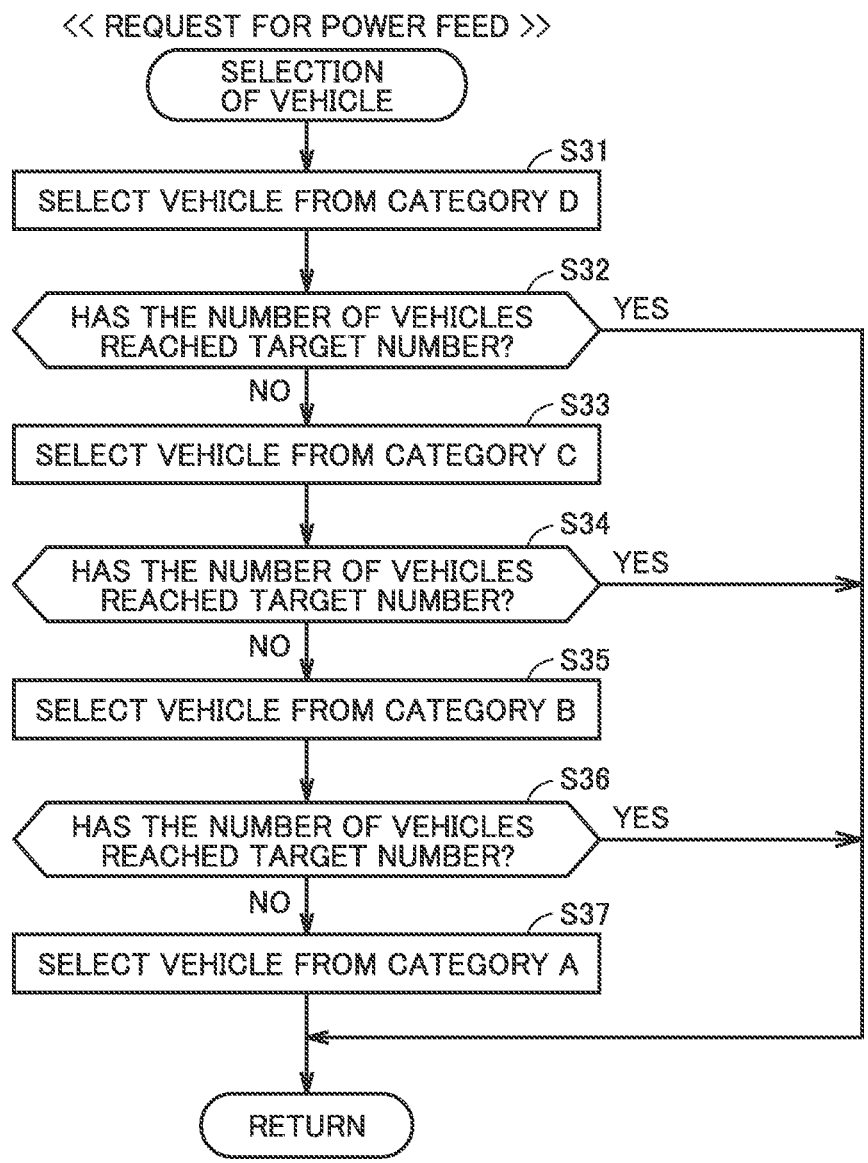
FIG. 9 is a flowchart showing details of processing performed at the time when the power management apparatus according to the embodiment of the present disclosure selects a DR suppression vehicle.

When selector 302 selects a DR suppression vehicle, it selects an electrically powered vehicle (vehicle 50) in the descending order of priority from the vehicle group in accordance with the priority for each category defined in the categorization information (see FIG. 5) in the power feed priority information. FIG. 9 is a flowchart showing details of processing performed in S12 in FIG. 4 by server 30 in selecting the DR suppression vehicle.

Referring to FIG. 9 together with FIGS. 1 to 6, in S31, selector 302 selects the DR suppression vehicle from among candidates D (see FIGS. 5 and 6) highest in priority in the vehicle group. Thereafter, in S32, selector 302 determines whether or not the number of DR suppression vehicles has reached the target number by selection only from category D.

When the number of vehicles as candidates D is equal to or larger than the target number, in S31, selector 302 selects the target number of DR suppression vehicles from among candidates D. For example, selector 302 randomly selects the DR suppression vehicle one by one from among candidates D, and when the number of DR suppression vehicles has reached the target number, it quits selection. Each time selector 302 selects a new DR suppression vehicle, selector 302 obtains a cumulative value of electric power that can be fed from each DR suppression vehicle, and when the obtained cumulative value of electric power has reached target electric power (the amount of power regulation), selector 302 may determine that the number of DR suppression vehicles has reached the target number. When the target number of DR suppression vehicles are selected in processing in S31 (YES in S32), the process returns to the main routine (FIG. 4) and the process proceeds to S13 in FIG. 4.

When the number of DR suppression vehicles has not reached the target number by selection only from category D (NO in S32), all of candidates D are selected in S31 and the process proceeds to S33. In S33, selector 302 selects the DR suppression vehicle from among candidates C (see FIGS. 5 and 6) second highest in priority in the vehicle group. Thereafter, in S34, selector 302 determines whether or not the number of DR suppression vehicles has reached the target number by selection from categories D and C.

When the total number of vehicles as candidates D and C is equal to or larger than the target number, in S33, selector 302 selects the DR suppression vehicle from among candidates C until the number of DR suppression vehicles reaches the target number. For example, selector 302 randomly selects the DR suppression vehicle one by one from among candidates C. The DR suppression vehicle (candidate C) selected in S33 is added to the DR suppression vehicles (all of candidates D) selected in S31. When the total number of DR suppression vehicles has reached the target number, selector 302 quits selection. When the target number of DR suppression vehicles are selected in processing in S31 and S33 (YES in S34), the process returns to the main routine (FIG. 4) and the process proceeds to S13 in FIG. 4.

When the number of DR suppression vehicles has not reached the target number by selection from categories D and C (NO in S34), all of candidates D and C are selected in S31 and S33 and the process proceeds to S35. In S35, selector 302 selects the DR suppression vehicle from among candidates B (see FIGS. 5 and 6) third highest in priority in the vehicle group. Thereafter, in S36, selector 302 determines whether or not the number of DR suppression vehicles has reached the target number by selection from categories D, C, and B.

When the total number of vehicles as candidates D, C, and B is equal to or larger than the target number, in S35, selector 302 selects the DR suppression vehicle from among candidates B until the number of DR suppression vehicles reaches the target number. For example, selector 302 randomly selects the DR suppression vehicle one by one from among candidates B. The DR suppression vehicle (candidate B) selected in S35 is added to the DR suppression vehicles (all of candidates D and C) selected in S31 and S33. When the total number of DR suppression vehicles has reached the target number, selector 302 quits selection. When the target number of DR suppression vehicles are selected in processing in S31, S33, and S35 (YES in S36), the process returns to the main routine (FIG. 4) and the process proceeds to S13 in FIG. 4.

When the number of DR suppression vehicles has not reached the target number by selection from categories D, C, and B (NO in S36), all of candidates D, C, and B are selected in S31, S33, and S35 and the process proceeds to S37. In S37, selector 302 selects a remaining DR suppression vehicle from among candidates A (see FIGS. 5 and 6) lowest in priority in the vehicle group.

In S37, the DR suppression vehicle corresponding to lack with respect to the target number is selected from among candidates A. For example, selector 302 randomly selects the DR suppression vehicle one by one from among candidates A. The DR suppression vehicle (candidate A) selected in S37 is added to the DR suppression vehicles (all of candidates D, C, and B) selected in S31, S33, and S35. When the total number of DR suppression vehicles has reached the target number, selector 302 quits selection. Thereafter, the process returns to the main routine (FIG. 4) and the process proceeds to S13 in FIG. 4.

In the processing shown in FIG. 9, in each of categories A to D, the DR suppression vehicle is randomly selected. Without being limited as such, a further priority may be set in each category. For example, in each category, vehicle 50 higher in B-SOC may sequentially be selected. Alternatively, a priority may be set as shown in FIG. 10.

Figure 10:
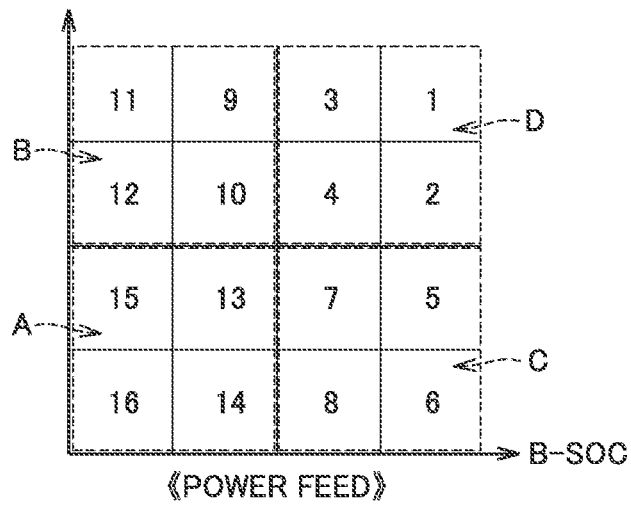
FIG. 10 is a diagram showing a modification of the power feed priority information shown in FIGS. 5 and 6.

FIG. 10 is a diagram showing a modification of the power feed priority information shown in FIGS. 5 and 6. A figure in FIG. 10 represents a priority in each region. In the example shown in FIG. 10, each of categories A to D is further divided into four regions and a priority is set for each region. In other words, the priority is set for each category resulting from division into sixteen based on the battery temperature and the B-SOC. In the example shown in FIG. 10, the priority for each region is defined such that a region higher in B-SOC is higher in priority and a region higher in battery temperature is higher in priority in each of categories A to D.

Referring again to FIG. 4 together with FIGS. 1 to 3, in S13, request processor 303 issues the charging request or the power feed request to the DR vehicles selected in S12. More specifically, request processor 303 transmits information representing the type of DR (for example, the charging request or the power feed request), the amount of power regulation, and the DR period to a user of each DR vehicle and requests the user to give an answer as to approval of the request (answerback). The request from request processor 303 to the user may be transmitted to communication equipment 180 mounted on the DR vehicle or to portable terminal 80 carried by the user of the DR vehicle. In this embodiment, the DR vehicles are identical in DR period. Without being limited as such, the DR period may be set as being shifted for each DR vehicle.

In S14, exclusion processor 304 determines whether or not the users of all DR vehicles have given answers indicating approval of the request. This determination is made, for example, at timing of reception of answers from all users or timing of lapse of a prescribed time period since issuance of the request. In this embodiment, a user who has not yet transmitted the answer even after lapse of the prescribed time period since issuance of the request is handled similarly to a user who has given an answer to the effect that the user does not approve the request.

When determination as NO is made (at least one user has not approved the request) in S14, in S15, exclusion processor 304 excludes vehicle 50 belonging to the user who has not approved the request from the vehicle group (the candidates for the DR vehicle). Thereafter, the process returns to S12. Vehicle 50 excluded in S15 is not selected in S12.

When determination as YES is made (all user have approved the request) in S14, in S16, request processor 303 has storage 32 store the DR vehicle and the DR period involved with the approved request and transmits a DR setting signal to each DR vehicle. The DR setting signal refers to a signal that requests each DR vehicle to carry out control as requested during the DR period. In this embodiment, the DR setting signal requests each DR vehicle to carry out charging control or power feed control as requested and additionally to lower the temperature of battery 130 to a prescribed temperature or lower with cooling apparatus 132. When each DR vehicle receives the DR setting signal, it makes setting for the DR vehicle during the DR period as indicated in the DR setting signal. In this embodiment, the DR setting signal permits remote control of charging and discharging controller 502 in response to a command from server 30, and cooling (cooling in charging or cooling in power feed) of battery 130 under the control by charging and discharging controller 502 is set to ON.

After processing in S16, in S17, request processor 303 waits for start of the DR period involved with the approved request. When timing of start of the DR period comes (YES in S17), in S18, request processor 303 transmits the DR signal to each DR vehicle. The DR signal is a charging command or a power feed command for remote control of charging and discharging controller 502 of the DR vehicle. As charging and discharging controller 502 of each DR vehicle is remotely controlled in response to the DR signal, charging control or power feed control in accordance with the request (the charging request or the power feed request) is carried out in each DR vehicle. S18 according to this embodiment corresponds to an exemplary "third step." Then, in S19, request processor 303 determines whether or not the DR period has ended. During the DR period, determination as YES is made in S17 and determination as NO is made in S19, and the DR signal is continually transmitted from request processor 303 to each DR vehicle. When timing of end of the DR period comes (YES in S19), the series of processing shown in FIG. 4 ends.

Figure 11:
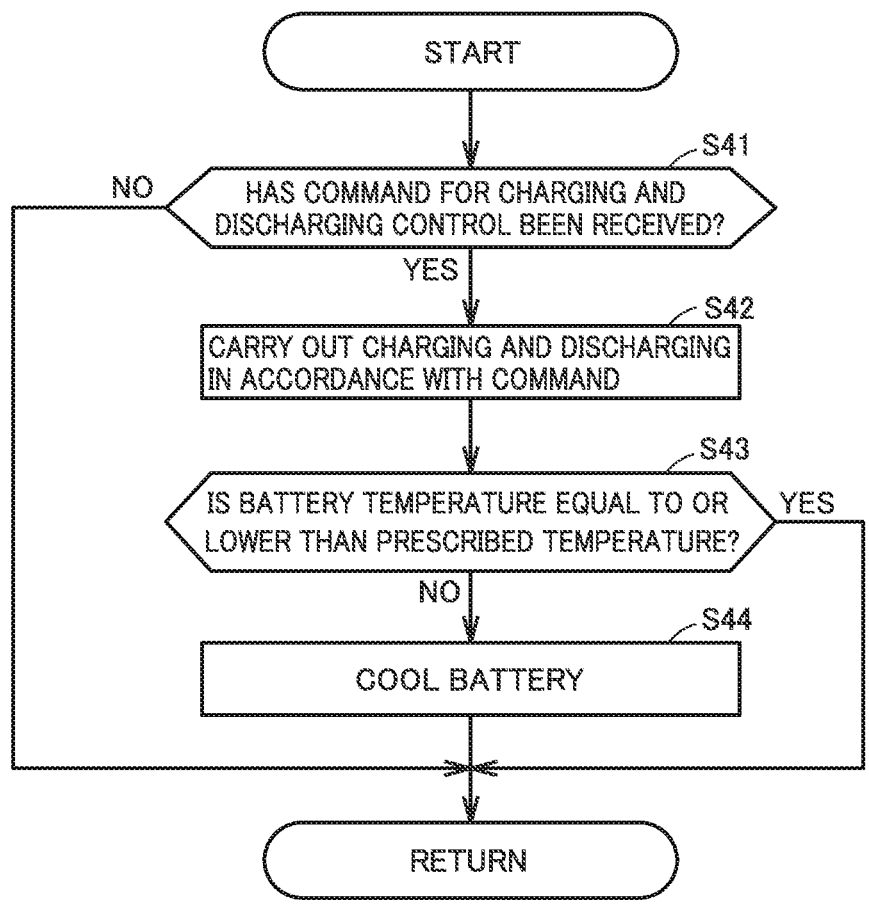
FIG. 11 is a flowchart showing processing performed by the electrically powered vehicle that has approved a request from the power management apparatus according to the embodiment of the present disclosure.

FIG. 11 is a flowchart showing processing performed by each DR vehicle that has approved the request from server 30. Processing shown in this flowchart is repeatedly performed by ECU 150 of each DR vehicle during the DR period involved with the request. As the DR period elapses, the series of processing shown in FIG. 11 ends and the DR vehicle becomes a non-DR vehicle (that is, vehicle 50 that does not fall under the DR vehicle).

Referring to FIG. 11 together with FIGS. 1 to 3, in S41, charging and discharging controller 502 of the DR vehicle waits for a command for charging and discharging control (that is, the charging command or the power feed command described previously) from server 30. When charging and discharging controller 502 receives the command from server 30 (YES in S41), in S42, charging and discharging controller 502 carries out charging and discharging control of battery 130 in accordance with the command. While ECU 150 continually receives the command from server 30, processing in S41 and S42 is repeated. Server 30 transmits the DR signal (that is, the command for charging and discharging control) to the DR vehicle during the DR period (see S18 in FIG. 4).

After processing in S42, in S43, charging and discharging controller 502 determines whether or not the temperature (for example, the average value of the temperatures of the cells) of battery 130 is equal to or lower than a prescribed temperature. When the temperature of battery 130 has exceeded the prescribed temperature (NO in S43), in S44, charging and discharging controller 502 controls cooling apparatus 132 to cool battery 130. Thereafter, the process returns to the initial step (S41). When the temperature of battery 130 is equal to or lower than the prescribed temperature (YES in S43), the process returns to the initial step (S41) without charging and discharging controller 502 carrying out cooling of battery 130.

Through the processing shown in FIG. 11, during the DR period, the DR vehicle carries out external charging (more specifically, charging of battery 130 with electric power from power grid PG) or external power feed (more specifically, power feed to power grid PG with electric power from battery 130) in accordance with the request (the charging request or the power feed request) and lowers the temperature of battery 130 to the prescribed temperature or lower with cooling apparatus 132. The DR vehicle can regulate supply and demand of power grid PG requested from the electric power utility company or the power market by external charging or external power feed. By setting battery 130 to a low temperature state, deterioration of battery 130 is suppressed.

As set forth above, server 30 according to this embodiment includes selector 302 that selects a target number of DR vehicles from a vehicle group including a plurality of vehicles 50 and request processor 303 that issues a charging request or a power feed request to each DR vehicle selected by selector 302. Selector 302 obtains the battery temperature and the B-SOC of each vehicle 50 included in the vehicle group and selects the DR vehicle in accordance with the priority predetermined based on the battery temperature and the B-SOC. For example, in selection in issuing the request for charging, the DR vehicle is selected in accordance with the priority in the charging priority information shown in FIGS. 5 and 6, so that vehicle 50 in which accelerated deterioration of battery 130 by charging is highly likely is less likely to be selected. In selection in issuing the request for power feed, the DR vehicle is selected in accordance with the priority in the power feed priority information shown in FIGS. 5 and 6, so that vehicle 50 in a state (the battery temperature and the B-SOC) that battery 130 tends to deteriorate is likely to be selected. As the DR vehicle is selected in accordance with such a priority, loss of life of battery 130 of each vehicle 50 under the control by server 30 is generally suppressed. Then, the DR vehicle selected by selector 302 can regulate supply and demand of power grid PG (power network).

When selector 302 selects the DR vehicle (S12) and thereafter the user of the selected DR vehicle does not approve the request, exclusion processor 304 according to the embodiment excludes that DR vehicle from the vehicle group. The configuration of exclusion processor 304, however, is not limited to the configuration as above. For example, exclusion processor 304 may exclude vehicle 50 that satisfies a prescribed exclusion requirement from the vehicle group prior to selection by selector 302. In the embodiment, cooling in charging and cooling in power feed under the control by charging and discharging controller 502 is started at timing of start of external charging and external power feed, respectively. Without being limited as such, cooling in charging and cooling in power feed under the control by charging and discharging controller 502 may be started before start of external charging and external power feed.

Figure 12:
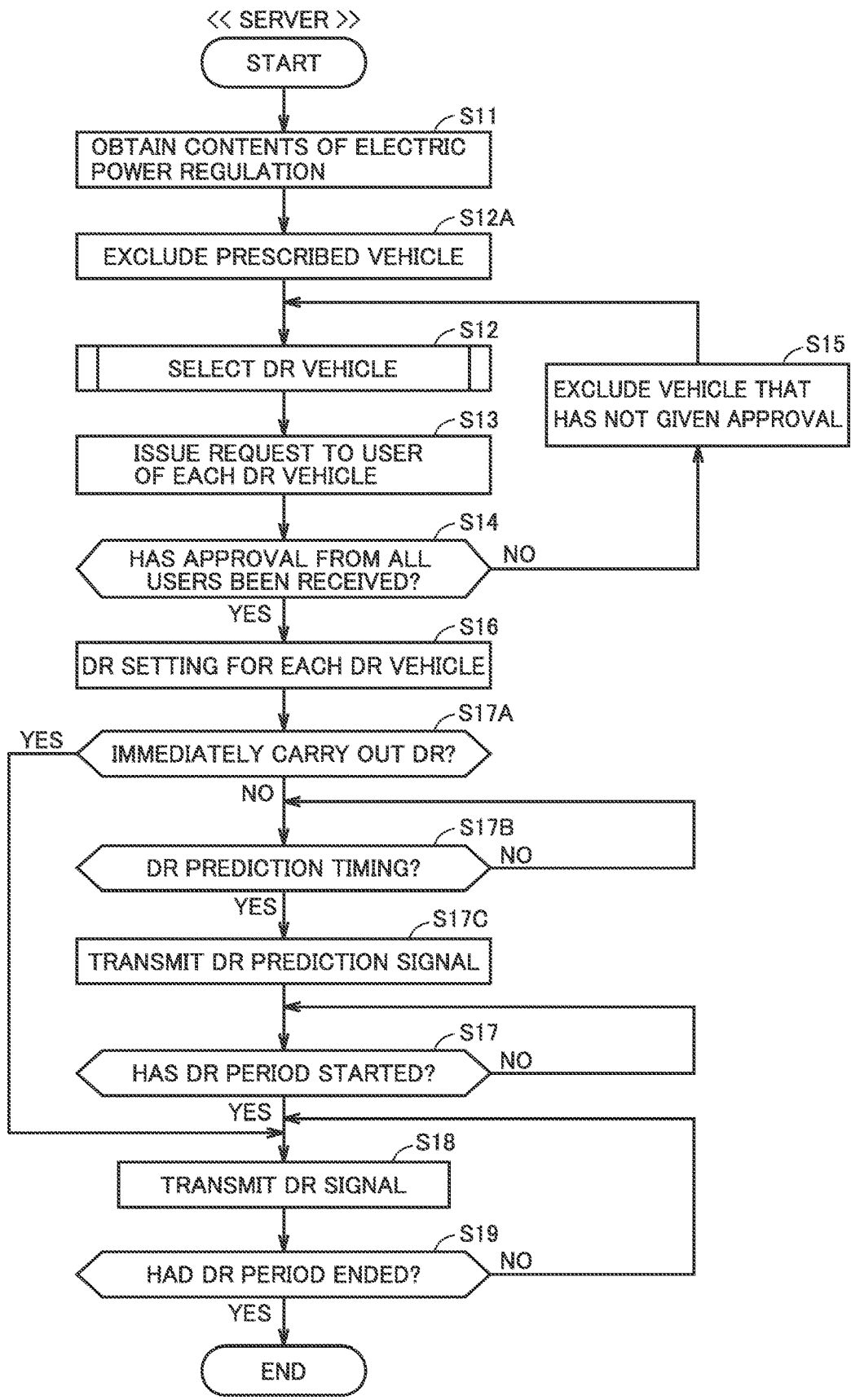
FIG. 12 is a flowchart showing a modification of processing shown in FIG. 4.

FIG. 12 is a flowchart showing a modification of the processing shown in FIG. 4. Processing shown in FIG. 12 additionally includes S12A and S17A to S17C in the processing shown in FIG. 4. S12A and S17A to S17C will be described below.

Referring to FIG. 12 together with FIGS. 1 to 3, processing in S12A is performed after S11. In S12A, exclusion processor 304 excludes vehicle 50 that satisfies a prescribed exclusion requirement from the vehicle group, prior to S12 (selection of the DR vehicle). More specifically, exclusion processor 304 performs first to third exclusion processing which will be described below.

When the DR period indicates immediate execution, exclusion processor 304 performs first exclusion processing. As a result of the first exclusion processing, vehicle 50 not connected to power grid PG is excluded from the vehicle group. When the DR period indicates immediate execution, request processor 303 requests the DR vehicle to immediately carry out external charging (more specifically, charging of battery 130 with electric power from power grid PG) or external power feed (more specifically, power feed to power grid PG with electric power from battery 130). Vehicle 50 not connected to power grid PG (for example, vehicle 50 not connected to EVSE 40 through charging cable 42) is highly likely to be unable to meet the request for immediate execution of external charging or external power feed. Therefore, when the DR period indicates immediate execution, such vehicle 50 is excluded from the vehicle group prior to S12 (selection of the DR vehicle).

When the DR period does not indicate immediate execution, exclusion processor 304 performs second exclusion processing. As a result of the second exclusion processing, vehicle 50 in which the B-SOC is lower than a prescribed SOC value and the battery temperature is higher than a prescribed temperature is excluded from the vehicle group.

Figure 13:
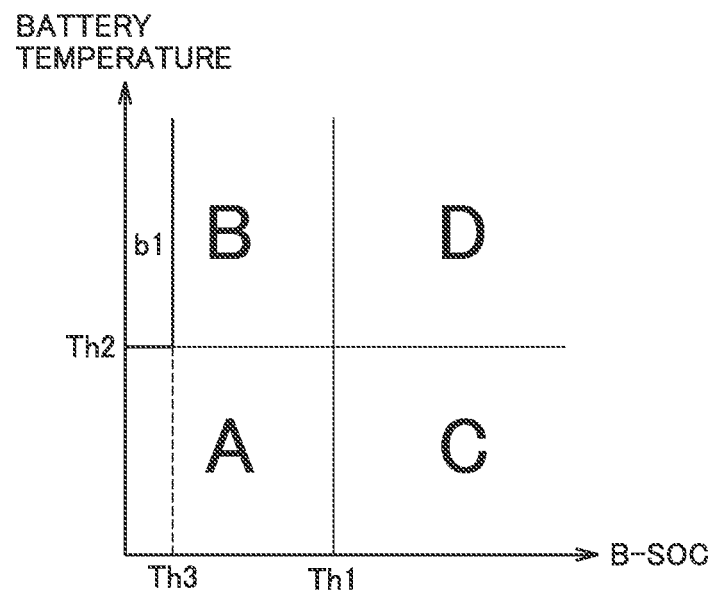
FIG. 13 is a diagram for illustrating second exclusion processing by an exclusion processor according to the modification.

FIG. 13 is a diagram for illustrating the second exclusion processing by exclusion processor 304 according to the modification. Categories A to D shown in FIG. 13 are the same as categories A to D shown in FIG. 5.

Referring to FIG. 13, as a result of the second exclusion processing, a part of candidates B is excluded from the vehicle group. More specifically, exclusion processor 304 excludes vehicle 50 belonging to a region b1 where the B-SOC is lower than a threshold value Th3 within category B from the vehicle group prior to S12 (selection of the DR vehicle). In the example shown in FIG. 13, threshold value Th3 corresponds to an exemplary "fifth threshold value" according to the present disclosure and threshold value Th2 corresponds to an exemplary "prescribed temperature" according to the present disclosure.

Figure 14:
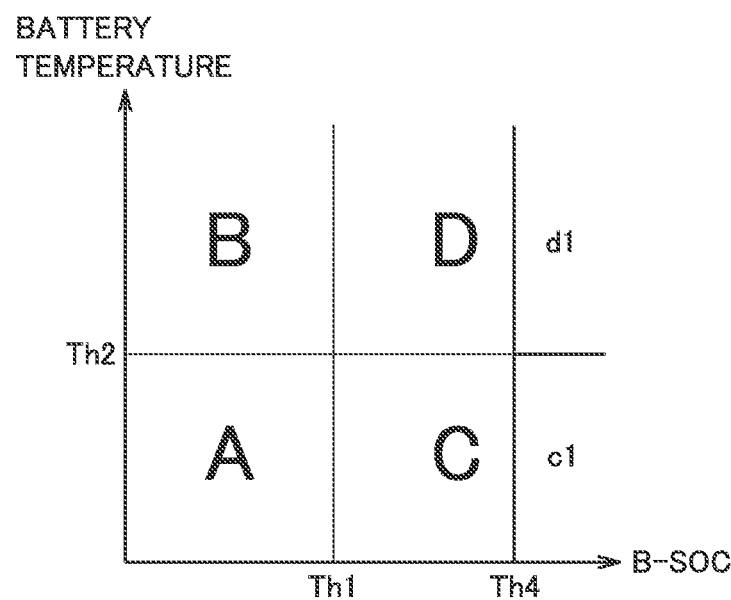
FIG. 14 is a diagram for illustrating an electrically powered vehicle excluded in third exclusion processing by the exclusion processor according to the modification.

When the type of DR is the charging request and the outdoor temperature is equal to or higher than a prescribed threshold value, exclusion processor 304 performs the third exclusion processing. As a result of the third exclusion processing, vehicle 50 in which the B-SOC is higher than the prescribed SOC value is excluded from the vehicle group. FIG. 14 is a diagram for illustrating vehicle 50 excluded in the third exclusion processing. Categories A to D shown in FIG. 14 are the same as categories A to D shown in FIG. 5.

Referring to FIG. 14, as a result of the third exclusion processing, a part of candidates C and a part of candidates D are excluded from the vehicle group. More specifically, exclusion processor 304 excludes vehicle 50 belonging to each of a region cl where the B-SOC is higher than a threshold value Th4 within category C and a region dl where the B-SOC is higher than threshold value Th4 within category D from the vehicle group prior to S12 (selection of the DR vehicle). In the example shown in FIG. 14, threshold value Th4 corresponds to an exemplary "third threshold value" according to the present disclosure.

Figure 15:
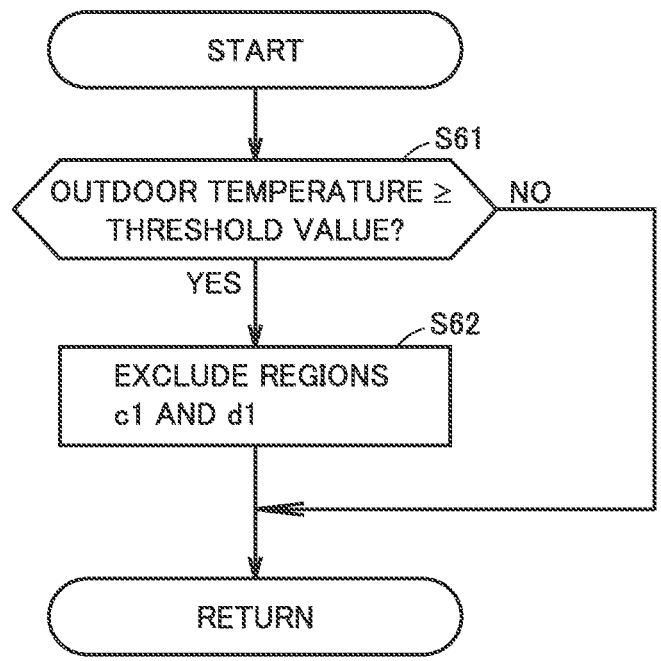
FIG. 15 is a flowchart showing processing performed by the exclusion processor when a type of DR is a charging request in the modification shown in FIG. 12.

FIG. 15 is a flowchart showing processing performed by exclusion processor 304 when the type of DR is the charging request in the modification shown in FIG. 12. The processing shown in this flowchart is performed in S12A in FIG. 12. Referring to FIG. 15 together with FIGS. 1 to 3, in S61, exclusion processor 304 determines whether or not the outdoor temperature is equal to or higher than a prescribed threshold value. Exclusion processor 304 can obtain the outdoor temperature in an area where the vehicle group is located, for example, by making use of weather information provided by the Japan Meteorological Agency or a data center. Alternatively, exclusion processor 304 may obtain the outdoor temperature in the area where the vehicle group is located by making use of vehicle state data received from each vehicle 50 included in the vehicle group.

When the outdoor temperature is equal to or higher than the prescribed threshold value (YES in S61), in S62, exclusion processor 304 performs the third exclusion processing. As a result of the third exclusion processing, vehicle 50 belonging to regions cl and dl (FIG. 14) is excluded from the vehicle group. When the outdoor temperature is lower than the prescribed threshold value (NO in S61), exclusion processor 304 does not perform the third exclusion processing. When battery 130 in the high SOC state is charged while the outdoor temperature is high, the temperature of battery 130 increases during charging and battery 130 is highly likely to be in the high-SOC and high-temperature state. When battery 130 at the high SOC and the high temperature is charged, deterioration of battery 130 is accelerated. Therefore, when the outdoor temperature is equal to or higher than the prescribed threshold value, the third exclusion processing (S62) is performed prior to S12 (selection of the DR vehicle) and vehicle 50 high in SOC of battery 130 is excluded from the vehicle group.

Figure 16:
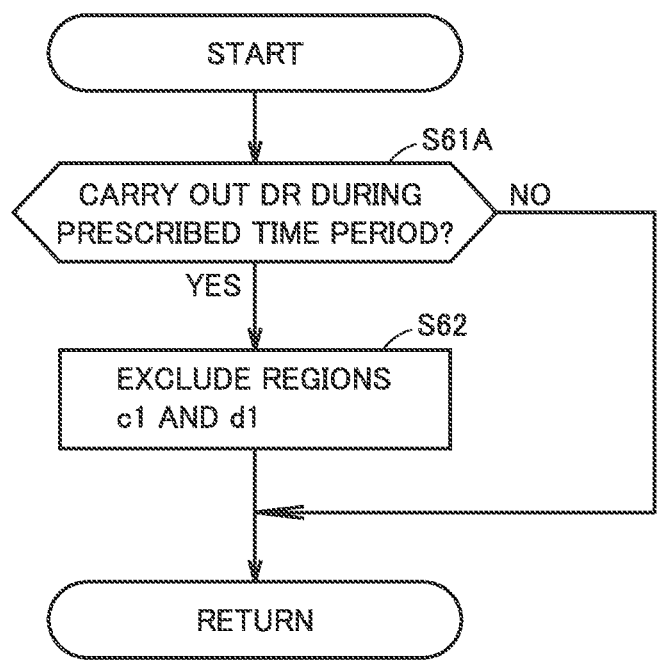
FIG. 16 is a flowchart showing a modification of the processing shown in FIG. 15.

The third exclusion processing may be performed when the type of DR is the charging request and the DR period includes at least a part of a prescribed time period (time of day). The prescribed time period may be, for example, time of day corresponding to the daytime and may be a time period from ten to fourteen. Instead of the processing shown in FIG. 15, exclusion processor 304 may perform processing shown in FIG. 16. FIG. 16 is a flowchart showing a modification of the processing shown in FIG. 15. Referring to FIG. 16 together with FIGS. 1 to 3, in S61A, exclusion processor 304 determines whether or not the DR period includes at least a part of a prescribed time period. For example, while the prescribed time period is set to a time period from ten to fourteen, determination as YES is made in S61A when the DR period is set to a period from nine to eleven, determination as YES is made in S61A when the DR period is set to a period from eleven to twelve, and determination as NO is made in S61A when the DR period is set to a period from sixteen to seventeen.

When determination as YES is made in S61A, in S62, exclusion processor 304 performs the third exclusion processing. As a result of the third exclusion processing, vehicle 50 belonging to regions cl and dl (FIG. 14) is excluded from the vehicle group. When determination as NO is made in S61A, exclusion processor 304 does not perform the third exclusion processing. When battery 130 is charged while the SOC of battery 130 is high during the daytime when the temperature tends to increase, the temperature of battery 130 increases during charging and battery 130 is highly likely to be in the high-SOC and high-temperature state. Therefore, in the example shown in FIG. 16, when external charging in accordance with the charging request is carried out during the daytime, the third exclusion processing (S62) is performed prior to S12 (selection of the DR vehicle), and vehicle 50 high in SOC of battery 130 is excluded from the vehicle group. When external charging in accordance with the charging request is carried out during the night, the third exclusion processing is not performed. In this example, threshold value Th4 shown in FIG. 14 corresponds to an exemplary "fourth threshold value" according to the present disclosure.

Referring again to FIG. 12 together with FIGS. 1 to 3, processing in S17A is performed after S16. In S17A, request processor 303 determines whether or not the DR period indicates immediate execution. When the DR period indicates immediate execution (YES in S17A), the process proceeds to S18 and the request (the charging request or the power feed request) is immediately issued to each DR vehicle. When the DR period does not indicate immediate execution (NO in S17A), in S17B, request processor 303 waits for prescribed DR prediction timing. The DR prediction timing refers, for example, to timing close to start of the DR period, and may be timing prescribed time (for example, approximately three to fifteen minutes) before the timing of start of the DR period. When the DR prediction timing comes (YES in S17B), in S17C, request processor 303 transmits a DR prediction signal to each DR vehicle. The DR prediction signal refers to a signal that predicts start of the DR period. Thereafter, the process proceeds to S17.

Figure 17:
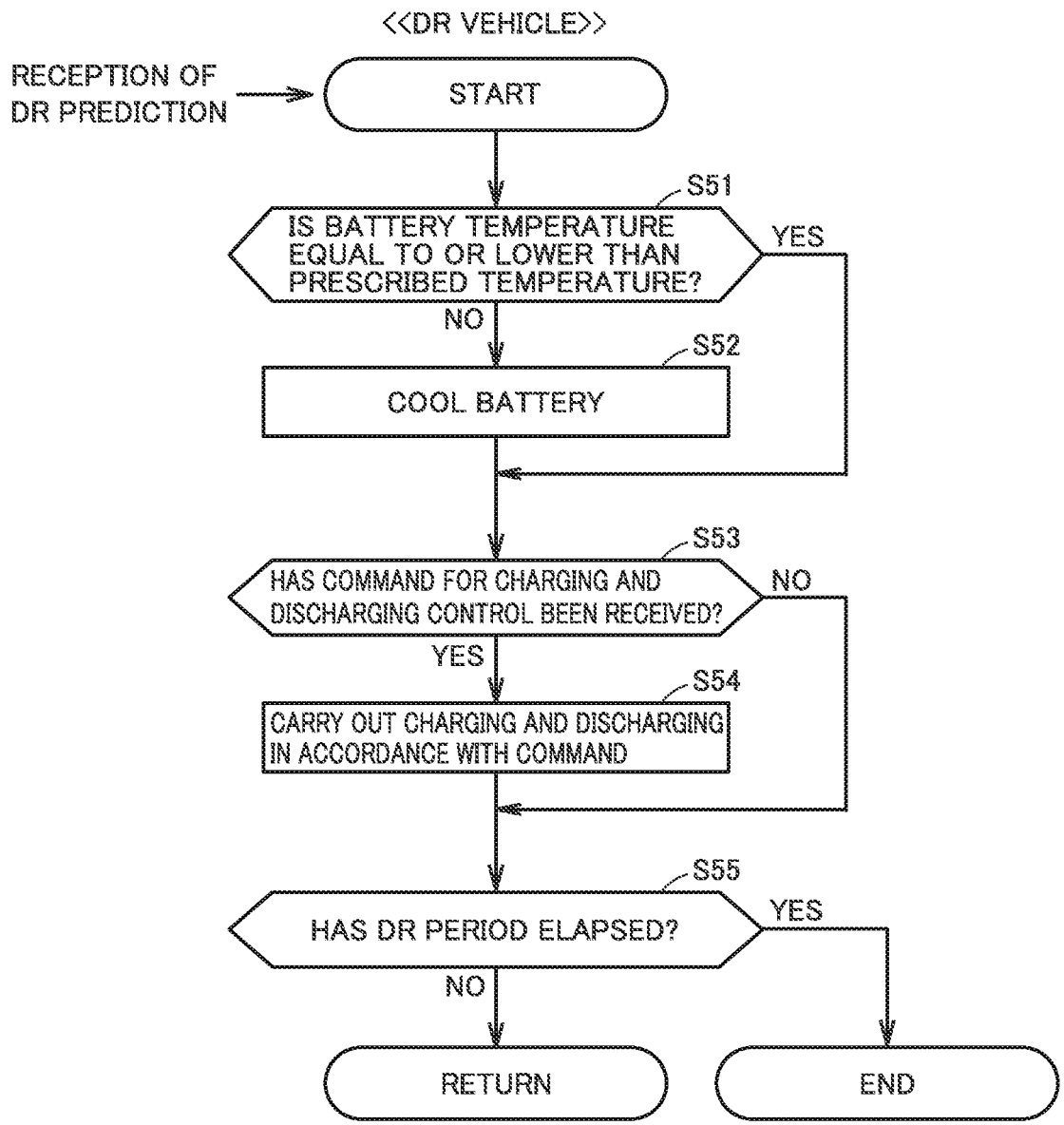
FIG. 17 is a flowchart showing processing performed when the electrically powered vehicle receives a DR prediction signal.

In this modification, when the DR period starts before reception of the DR prediction signal by the DR vehicle, the DR vehicle performs a series of processing shown in FIG. 11, and when the DR vehicle receives the DR prediction signal before start of the DR period, the DR vehicle performs a series of processing shown in FIG. 17. When the DR vehicles are different in DR period from one another, processing in S17A to S19 in FIG. 12 may be performed for each DR vehicle.

FIG. 17 is a flowchart showing processing performed when the DR vehicle receives the DR prediction signal. Referring to FIG. 17 together with FIGS. 1 to 3, in S51, charging and discharging controller 502 of the DR vehicle determines whether or not the temperature (for example, the average value of the temperatures of the cells) of battery 130 is equal to or lower than a prescribed temperature. When the temperature of battery 130 exceeds the prescribed temperature (for example, threshold value Th2) (NO in S51), in S52, charging and discharging controller 502 controls cooling apparatus 132 to cool battery 130. Thereafter, the process proceeds to S53. When the temperature of battery 130 is equal to or lower than the prescribed temperature (YES in S51), the process proceeds to S53 without charging and discharging controller 502 carrying out cooling of battery 130.

In S53, charging and discharging controller 502 determines whether or not it has received a command for charging and discharging control (that is, the charging command or the power feed command described previously) from server 30. When charging and discharging controller 502 has received the command from server 30 (YES in S53), in S54, it carries out charging and discharging control of battery 130 in accordance with that command.

In S55, charging and discharging controller 502 determines whether or not the DR period has elapsed. When the DR period has not elapsed (NO in S55), the process returns to the initial step (S51).

In this modification, when the temperature of battery 130 has exceeded the prescribed temperature (for example, threshold value Th2), the DR setting signal (S16 in FIG. 12) at the time when the DR period does not indicate immediate execution requests each DR vehicle to start cooling of battery 130 by cooling apparatus 132 prior to start of charging or power feed in accordance with the request. The DR setting signal sets cooling (cooling in charging or cooling in power feed) of battery 130 under the control by charging and discharging controller 502 of each DR vehicle to ON. When the temperature of battery 130 has exceeded the prescribed temperature (NO in S51) at the time point of reception of the DR prediction signal by the DR vehicle, charging and discharging controller 502 starts cooling of battery 130 by cooling apparatus 132 (S52) in accordance with the setting, prior to start of external charging or external power feed. When the DR period does not indicate immediate execution, the second exclusion processing (S12A) is performed prior to S12 (selection of the DR vehicle) in FIG. 12, and vehicle 50 lower in SOC of battery 130 is excluded from the vehicle group. As a result of the second exclusion processing, overdischarging of battery 130 while cooling apparatus 132 is driven in the DR vehicle is suppressed.

Server 30 transmits the DR signal (that is, the command for charging and discharging control) to each DR vehicle during the DR period (see S18 in FIG. 12). During a period from reception of the DR prediction signal by the DR vehicle until start of the DR period, determination as NO is made in both of S53 and S55. A battery cooling period before the DR period can be adjusted based on DR prediction timing (S17B in FIG. 12). As the DR prediction timing is earlier, the battery cooling period before the DR period is longer. The DR prediction timing may be set such that the temperature of battery 130 is equal to or lower than the prescribed temperature (for example, threshold value Th2) before start of the DR period. When the DR period starts, determination as YES is made in S53, and in S54, charging or power feed in accordance with the request (the charging request or the power feed request) is carried out. When the DR period elapses (YES in S55), the series of processing shown in FIG. 17 ends.

According to the modification shown in FIGS. 12 to 17 as well, loss of life of the power storage provided in each of the plurality of electrically powered vehicles can generally be suppressed while supply and demand of the power grid is regulated.

In the priority information shown in FIG. 6, the charging priority information defines the priority in the order of category A, category B, category C, and category D, and the power feed priority information defines the priority in the order of category D, category C, category B, and category A. Without being limited as such, the priority for each category can be modified as appropriate.

FIG. 18 is a diagram showing a first modification of the priority information shown in FIG. 6. As shown in FIG. 18, the priority information in the charging priority information may define the priority in the order of category A, category B, category D, and category C. Each vehicle 50 belonging to category D can lower the temperature of battery 130 by cooling battery 130 with cooling apparatus 132. As the temperature of battery 130 lowers, deterioration of battery 130 is suppressed. As electric power is consumed by cooling of battery 130 by cooling apparatus 132, an amount of power consumption can be increased in accordance with a request for DR increase. Therefore, supply and demand of power grid PG (power network) can effectively be regulated by setting the priority of category D to be higher than the priority of category C.

FIG. 19 is a diagram showing a second modification of the priority information shown in FIG. 6. As shown in FIG. 19, the priority information in the charging priority information may define the priority in the order of category B, category A, category D, and category C. Each vehicle 50 belonging to category B can also increase the amount of power consumption in response to the request for DR increase, by consuming electric power for cooling of battery 130 with cooling apparatus 132, similarly to each vehicle 50 belonging to category D. Therefore, according to the priority, supply and demand of power grid PG (power network) can effectively be regulated.

Figures 20, 21:
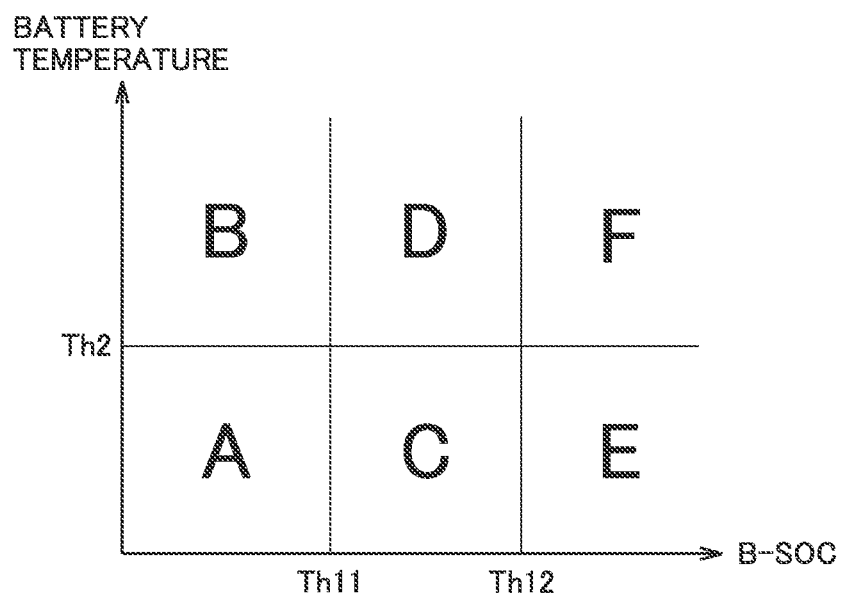
FIG. 20 is a diagram showing a modification of the categorization information shown in FIG. 5.
FIG. 21 is a diagram showing an exemplary priority of six categories defined based on the categorization information shown in FIG. 20.

The number of categories can also be modified as appropriate. FIG. 20 is a diagram showing a modification of the categorization information shown in FIG. 5. Referring to FIG. 20, this categorization information defines six categories (for example, categories A to F) based on the battery temperature and the B-SOC. Category A refers to a category in which the B-SOC is lower than a threshold value Th11 and the battery temperature is lower than threshold value Th2. Category B refers to a category in which the B-SOC is lower than threshold value Th11 and the battery temperature is not lower than threshold value Th2. Category C refers to a category in which the B-SOC is not lower than threshold value Th11 and not higher than a threshold value Th12 and the battery temperature is lower than threshold value Th2. Category D refers to a category in which the B-SOC is not lower than threshold value Th11 and not higher than threshold value Th12 and the battery temperature is not lower than threshold value Th2. Category E refers to a category in which the B-SOC is higher than threshold value Th12 and the battery temperature is lower than threshold value Th2. Category F refers to a category in which the B-SOC is higher than threshold value Th12 and the battery temperature is not lower than threshold value Th2. Each of threshold values Th11, Th12, and Th2 can be set to any value. A boundary value between categories (for example, threshold values Th11, Th12, and Th2) may be variable depending on a vehicle model or a battery capacity.

FIG. 21 is a diagram showing an exemplary priority of the six categories defined based on the categorization information shown in FIG. 20. Referring to FIG. 21, in this example, the priority information in the charging priority information defines the priority in the order of category A, category B, category C, category D, category E, and category F. The priority information in the power feed priority information defines the priority in the order of category F, category E, category D, category C, category B, and category A. Server 30 can generally suppress loss of life of the power storage provided in each of the plurality of electrically powered vehicles while it regulates supply and demand of the power grid, also by selecting an electrically powered vehicle in accordance with such a priority.

Server 30 may preferentially select as the DR vehicle, an electrically powered vehicle belonging to a user who has indicated in advance to server 30, his/her intention to prioritize an incentive over lifetime of the power storage, regardless of the priority information (the charging priority information and the power feed priority information).

A configuration of the vehicle is not limited to the configuration shown in FIG. 1. For example, in the configuration shown in FIG. 1, a charging apparatus capable only of external charging or a power feed apparatus capable only of external power feed may be adopted instead of charger-discharger 120. The vehicle may be capable of wireless charging. The vehicle is not limited to a passenger vehicle but may be a bus or a truck.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power management apparatus that regulates supply and demand of a power grid by issuing to an electrically powered vehicle including a power storage, a request for charging of the power storage with electric power of the power grid or power feed to the power grid, the power management apparatus comprising:
   a selector that selects a target number of electrically powered vehicles from a vehicle group including a plurality of electrically powered vehicles;
   a request processor that issues the request to each electrically powered vehicle selected by the selector, wherein
   the selector obtains a temperature and an SOC of the power storage of each electrically powered vehicle included in the vehicle group and makes selection in accordance with a priority predetermined based on the temperature of the power storage and the SOC of the power storage; and
   a first storage that stores first priority information that defines a priority in selecting an electrically powered vehicle to which the request for the charging is to be issued from the request processor,
   wherein
   the first priority information defines a priority for each of a plurality of categories set based on the temperature of the power storage and the SOC of the power storage such that a category lower in SOC of the power storage is higher in priority and a category lower in temperature of the power storage is higher in priority, and
   in selecting the electrically powered vehicle to which the request for the charging is to be issued from the request processor, the selector selects the electrically powered vehicle in a descending order of priority from the vehicle group in accordance with the priority for each category defined in the first priority information;
   each of the plurality of electrically powered vehicles included in the vehicle group includes a cooling apparatus that cools the power storage,
   the request processor issues to each electrically powered vehicle selected by the selector, a further request to lower the temperature of the power storage to a prescribed temperature or lower with the cooling apparatus, and
   the first priority information defines the priority of a first category, a second category, a third category, and a fourth category in the order of the first category, the second category, the third category, and the fourth category,
   in the first category, the SOC of the power storage is lower than a first threshold value and the temperature of the power storage is lower than a second threshold value,
   in the second category, the SOC of the power storage is lower than the first threshold value and the temperature of the power storage is higher than the second threshold value,
   in the third category, the SOC of the power storage is higher than the first threshold value and the temperature of the power storage is lower than the second threshold value, and
   in the fourth category, the SOC of the power storage is higher than the first threshold value and the temperature of the power storage is higher than the second threshold value.

2. The power management apparatus according to claim 1, further comprising a second storage that stores second priority information that defines a priority in selecting an electrically powered vehicle to which the request for the power feed is to be issued from the request processor, wherein
   the second priority information defines a priority for each of a plurality of categories set based on the temperature of the power storage and the SOC of the power storage such that a category higher in SOC of the power storage is higher in priority and a category higher in temperature of the power storage is higher in priority, and
   in selecting the electrically powered vehicle to which the request for the power feed is to be issued from the request processor, the selector selects the electrically powered vehicle in a descending order of priority from the vehicle group in accordance with the priority for each category defined in the second priority information.

3. The power management apparatus according to claim 1, further comprising an exclusion processor that excludes an electrically powered vehicle that satisfies a prescribed exclusion requirement from the vehicle group.

4. The power management apparatus according to claim 3, wherein
   when a period during which the charging requested by the request processor is to be carried out includes at least a part of a prescribed time period, the exclusion processor excludes an electrically powered vehicle in which the SOC of the power storage is higher than a fourth threshold value from the vehicle group prior to selection of an electrically powered vehicle to which the request for the charging is to be issued from the request processor.

5. The power management apparatus according to claim 3, wherein
each of the plurality of electrically powered vehicles included in the vehicle group includes a cooling apparatus that cools the power storage with electric power of the power storage,
the request processor further requests each electrically powered vehicle selected by the selector to start, when the temperature of the power storage exceeds a prescribed temperature, cooling of the power storage by the cooling apparatus prior to start of charging in accordance with the request, and
the exclusion processor excludes an electrically powered vehicle in which the SOC of the power storage is lower than a fifth threshold value and a temperature of the power storage is higher than the prescribed temperature from the vehicle group.

6. The power management apparatus according to claim 3, wherein
when the request processor issues a request for immediate execution of charging of the power storage or power feed to the power grid, the exclusion processor excludes an electrically powered vehicle not connected to the power grid from the vehicle group prior to the selection by the selector.

7. The power management apparatus according to claim 3, wherein
when an outdoor temperature is equal to or higher than a prescribed value, the exclusion processor excludes an electrically powered vehicle in which the SOC of the power storage is higher than a third threshold value from the vehicle group prior to selection of an electrically powered vehicle to which the request for the charging is to be issued from the request processor.

8. A power management method of regulating supply and demand of a power grid by issuing to an electrically powered vehicle including a power storage, a request for charging of the power storage with electric power of the power grid or power feed to the power grid, the power management method comprising:
obtaining a temperature and an SOC of the power storage of each electrically powered vehicle included in a vehicle group;
selecting a target number of electrically powered vehicles from the vehicle group in accordance with a priority predetermined based on the temperature of the power storage and the SOC of the power storage;
issuing the request to each selected electrically powered vehicle;
storing first priority information that defines a priority in selecting an electrically powered vehicle to which the request for the charging is to be issued from the request processor,
wherein
the first priority information defines a priority for each of a plurality of categories set based on the temperature of the power storage and the SOC of the power storage such that a category lower in SOC of the power storage is higher in priority and a category lower in temperature of the power storage is higher in priority, and in selecting the electrically powered vehicle to which the request for the charging is to be issued from the request processor, selecting the electrically powered vehicle in a descending order of priority from the vehicle group in accordance with the priority for each category defined in the first priority information;
each of the plurality of electrically powered vehicles included in the vehicle group includes a cooling apparatus that cools the power storage,
issuing to each electrically powered vehicle that has been selected, a further request to lower the temperature of the power storage to a prescribed temperature or lower with the cooling apparatus, and
the first priority information defines the priority of a first category, a second category, a third category, and a fourth category in the order of the first category, the second category, the third category, and the fourth category,
in the first category, the SOC of the power storage is lower than a first threshold value and the temperature of the power storage is lower than a second threshold value,
in the second category, the SOC of the power storage is lower than the first threshold value and the temperature of the power storage is higher than the second threshold value,
in the third category, the SOC of the power storage is higher than the first threshold value and the temperature of the power storage is lower than the second threshold value, and
in the fourth category, the SOC of the power storage is higher than the first threshold value and the temperature of the power storage is higher than the second threshold value.

9. A power management apparatus that regulates supply and demand of a power grid by issuing to an electrically powered vehicle including a power storage, a request for charging of the power storage with electric power of the power grid or power feed to the power grid, the power management apparatus comprising:
a selector that selects a target number of electrically powered vehicles from a vehicle group including a plurality of electrically powered vehicles;
a request processor that issues the request to each electrically powered vehicle selected by the selector, wherein
the selector obtains a temperature and an SOC of the power storage of each electrically powered vehicle included in the vehicle group and makes selection in accordance with a priority predetermined based on the temperature of the power storage and the SOC of the power storage; and
an exclusion processor that excludes an electrically powered vehicle that satisfies a prescribed exclusion requirement from the vehicle group, wherein
when the request processor issues a request for immediate execution of charging of the power storage or power feed to the power grid, the exclusion processor excludes an electrically powered vehicle not connected to the power grid from the vehicle group prior to the selection by the selector.

* * * * *